(12) United States Patent
Chang

(10) Patent No.: US 12,110,974 B2
(45) Date of Patent: Oct. 8, 2024

(54) DOUBLE-POWER-SUPPLY COMPLEX CONTROL DEVICE

(71) Applicant: CH CREATIVE CO., LTD., Taipei (TW)

(72) Inventor: Jui-Cheng Chang, Keelung (TW)

(73) Assignee: CH Creative Co., Ltd., Taipei (TW)

( * ) Notice: Subject to any disclaimer, the term of this patent is extended or adjusted under 35 U.S.C. 154(b) by 474 days.

(21) Appl. No.: 17/597,378

(22) PCT Filed: Jul. 6, 2020

(86) PCT No.: PCT/CN2020/100341
§ 371 (c)(1),
(2) Date: Jan. 4, 2022

(87) PCT Pub. No.: WO2021/004419
PCT Pub. Date: Jan. 14, 2021

(65) Prior Publication Data
US 2022/0252166 A1    Aug. 11, 2022

(30) Foreign Application Priority Data

Jul. 5, 2019   (CN) .......................... 201910605304.3

(51) Int. Cl.
*F16K 11/22*   (2006.01)
*F15B 13/04*   (2006.01)
(Continued)

(52) U.S. Cl.
CPC .......... *F16K 11/22* (2013.01); *F15B 13/0406* (2013.01); *F16K 27/065* (2013.01);
(Continued)

(58) Field of Classification Search
CPC ........ F16K 11/22; F16K 11/165; F16K 11/20; F16K 27/065; F16K 31/535; F16K 35/14;
(Continued)

(56) References Cited

U.S. PATENT DOCUMENTS 2,076,842 A * 4/1937 Henning ............... F16K 11/165
                                                         210/341
2,399,460 A * 4/1946 Britton ................... F16K 11/22
                                                         251/249

(Continued)

*Primary Examiner* — Craig J Price
*Assistant Examiner* — Andrew J Rost
(74) *Attorney, Agent, or Firm* — Rosenberg, Klein & Lee

(57) ABSTRACT

A double-power-supply complex control device includes a main body. Four control sections and two load flow ways are disposed in the main body. A main flow way is disposed in control section. Four switch members of a switch assembly are assembled and disposed in the main flow ways. A circumference of each main flow way is in communication with multiple bypasses. The main flow ways of each two of the control sections are in communication with a fluid output passage and a fluid input passage of a power device. Some of the bypasses of control section are in communication with each other. A lower flow guide window is disposed on switch member in indirect communication with main flow way. When switch member is operated under external force, the lower flow guide window is switchable between the bypasses to selectively communicate with the bypasses to make different power devices drive.

19 Claims, 13 Drawing Sheets

(51) Int. Cl.
*F16K 27/06* (2006.01)
*F16K 31/53* (2006.01)

(52) U.S. Cl.
CPC ... *F16K 31/535* (2013.01); *F15B 2211/20515* (2013.01); *F15B 2211/20523* (2013.01)

(58) Field of Classification Search
CPC ........ F15B 13/0406; F15B 2211/20515; F15B 2211/20523; F15B 2211/20576; F15B 2211/265; F15B 2211/31535; B60Y 2200/92; F16H 61/4035; F16H 61/444; Y10T 137/87981
USPC .......................... 137/883, 884, 614.11, 597
See application file for complete search history.

(56) References Cited

U.S. PATENT DOCUMENTS

| | | | | |
|---|---|---|---|---|
| 3,523,460 | A * | 8/1970 | Maurice | H01H 9/26 |
| | | | | 251/249 |
| 4,013,094 | A * | 3/1977 | Niskanen | F16K 35/14 |
| | | | | 137/597 |
| 4,196,752 | A * | 4/1980 | Niskanen | F16K 11/16 |
| | | | | 137/865 |
| 6,668,860 | B1 * | 12/2003 | Pas | B01D 35/12 |
| | | | | 137/599.14 |

* cited by examiner

DOUBLE-POWER-SUPPLY COMPLEX CONTROL DEVICE

BACKGROUND OF THE INVENTION

1. Field of the Invention

The present invention relates generally to a double-power-supply complex control device, and more particularly to a double-power-supply complex control device including one single main body having multiple main flow ways and multiple switch members disposed in the main flow ways. When the switch members are operated, the main flow ways are switchable between different fluid bypasses to selectively communicate with the fluid bypasses. Therefore, various fluid transfer paths of two power devices are formed to control one or both of the two power devices to drive a load in accordance with the requirement.

2. Description of the Related Art

Conventionally, multiple power devices can output fluid to drive a load for receiving the fluid power. The fluid transfer paths between the power devices and the load are generally controlled in such a manner that multiple connection pipelines are respectively disposed between the power devices and the load. An electromagnetic valve (or other control valve with switching on/off function) is disposed on each connection pipeline. By means of switching on/off the respective electromagnetic valves, the fluids output from the respective power devices can solely or together flow from different paths through the load. Accordingly, one single power device can drive the load or all the power devices can together drive the load to achieve various driving control states.

However, in practical application, the above assembly structure still has the following shortcomings:

First, the entire assembly utilizing multiple connection pipelines and multiple electromagnetic valves (or control valves) connected with the pipelines has a relatively complicated structure. Also, the control system of the assembly is more complicated. Therefore, the development and establishing cost for the entire system and structure is extremely high. Moreover, it is relatively inconvenient to operate and control the system. Furthermore, the numerous components of the system lead to increase of the possibility of damage and malfunction. This greatly increases the service cost.

In addition, the components of the connection pipelines and electromagnetic valves (or control valves) disposed between the driving device and driven device are connected with each other by means of connection members. After a long period of use, the connection members are subject to contamination or infiltration or corrosion of external oil, moisture and dust. As a result, leakage is apt to take place at the connection parts. This will cause reduction of the fluid pressure or even damage of the components of the electromagnetic valves (or control valves). Under such circumstance, the fluid will be unable to flow through the structure to cause failure of the system. This will directly affect the reliability and competitiveness of the products.

SUMMARY OF THE INVENTION

It is therefore a primary object of the present invention to provide a double-power-supply complex control device to solve the problems existing in application of the conventional fluid transfer path control device, which employs multiple power devices to drive a load.

To achieve the above object and effect, the double-power-supply complex control device of the present invention at least includes a main body. At least four control sections and at least two load flow ways are respectively disposed in the main body. A main flow way is disposed in each control section. At least four switch members of a switch assembly are respectively assembled and disposed in the main flow ways. A circumference of each main flow way is in communication with multiple bypasses. The main flow ways of each two of the control sections are respectively in communication with a fluid output passage and a fluid input passage of a power device. The load flow ways are in communication with two ends of a load. At least some of the bypasses of each control section are in communication with each other. A lower flow guide window is disposed on each switch member in indirect communication with each main flow way. In operation, the lower flow guide window is switchable between the respective bypasses to selectively communicate with the bypasses so that the fluid transfer can be controlled to make one or both of two different power devices drive the load.

In the above double-power-supply complex control device, a first control section, a second control section, a third control section and a fourth control section are respectively disposed in the main body. A first main flow way, a second main flow way, a third main flow way and a fourth main flow way are respectively correspondingly disposed at a center of the first, second, third and fourth control sections. A circumference of the first main flow way is sequentially in communication with a first pre-output bypass, a second pre-output bypass, a third pre-output bypass and a fourth pre-output bypass. A circumference of the second main flow way is sequentially in communication with a first pre-input bypass, a second pre-input bypass, a third pre-input bypass and a fourth pre-input bypass. A circumference of the third main flow way is sequentially in communication with a first post-output bypass, a second post-output bypass, a third post-output bypass and a fourth post-output bypass. A circumference of the fourth main flow way is sequentially in communication with a first post-input bypass, a second post-input bypass, a third post-input bypass and a fourth post-input bypass. The first pre-output bypass is in communication with the first pre-input bypass. The first post-output bypass is in communication with the first post-input bypass. The fourth pre-output bypass is in communication with the fourth post-input bypass. A switch assembly is composed of a first switch member, a second switch member, a third switch member and a fourth switch member, which are respectively disposed in the first, second, third and fourth main flow ways. A first flow guide passage, a second flow guide passage, a third flow guide passage and a fourth flow guide passage are respectively disposed in the first, second, third and fourth switch members in communication with the first, second, third and fourth main flow ways. An outer circumference of each switch member is formed with a first lower flow guide window, a second lower flow guide window, a third lower flow guide window and a fourth lower flow guide window in communication with the first, second, third and fourth flow guide passages. The first, second, third and fourth switch members are drivable to switch the first lower flow guide window between the first, second, third and fourth pre-output bypasses to selectively communicate with the first, second, third and fourth pre-output bypasses, the second lower flow guide window between the first, second, third and fourth pre-input bypasses to selectively communicate with the first, second, third and fourth pre-input bypasses, the third lower flow guide window between the first, second, third and fourth post-output bypasses to selectively communicate with the first, second, third and fourth post-output bypasses and the fourth lower flow guide window between the first, second, third and fourth post-input bypasses to selectively communicate with the first, second, third and fourth post-input bypasses.

In the above double-power-supply complex control device, the second and fourth post-output bypasses and the third pre-output bypass are in communication with a first load flow way and the third and fourth pre-input bypasses and the second post-input bypass are in communication with a second load flow way.

In the above double-power-supply complex control device, a first pre-output stop section, a second pre-output stop section, a third pre-output stop section and a fourth pre-output stop section are respectively disposed along the circumference of the first main flow way corresponding to the first, second, third and fourth pre-output bypasses. A first communication opening is respectively disposed between the first, second, third and fourth pre-output stop sections. Each first communication opening is in communication with the first and second pre-output bypasses. A first upper flow guide window is further disposed on the outer circumference of the first switch member in communication with the first flow guide passage, whereby when the first switch member is operated, the first upper flow guide window is synchronously moved with the first lower flow guide window and selectively aligned with one of the first, second, third and fourth pre-output stop sections. A first pre-input stop section, a second pre-input stop section, a third pre-input stop section and a fourth pre-input stop section are respectively disposed along the circumference of the second main flow way corresponding to the first, second, third and fourth pre-input bypasses. A second communication opening is respectively disposed between the first, second, third and fourth pre-input stop sections. Each second communication opening is in communication with the first and second pre-input bypasses. A second upper flow guide window is further disposed on the outer circumference of the second switch member in communication with the second flow guide passage, whereby when the second switch member is operated, the second upper flow guide window is synchronously moved with the second lower flow guide window and selectively aligned with one of the first, second, third and fourth pre-input stop sections. A first post-output stop section, a second post-output stop section, a third post-output stop section and a fourth post-output stop section are respectively disposed along the circumference of the third main flow way corresponding to the first, second, third and fourth post-output bypasses. A third communication opening is respectively disposed between the first, second, third and fourth post-output stop sections. Each third communication opening is in communication with the first and third post-output bypasses. A third upper flow guide window is further disposed on the outer circumference of the third switch member in communication with the third flow guide passage, whereby when the third switch member is operated, the third upper flow guide window is synchronously moved with the third lower flow guide window and selectively aligned with one of the first, second, third and fourth post-output stop sections. A first post-input stop section, a second post-input stop section, a third post-input stop section and a fourth post-input stop section are respectively disposed along the circumference of the fourth main flow way corresponding to the first, second, third and fourth post-input bypasses. A fourth communication opening is respectively disposed between the first, second, third and fourth post-input stop sections. Each fourth communication opening is in communication with the first and third post-input bypasses. A fourth upper flow guide window is further disposed on the outer circumference of the fourth switch member in communication with the fourth flow guide passage, whereby when the fourth switch member is operated, the fourth upper flow guide window is synchronously moved with the fourth lower flow guide window and selectively aligned with one of the first, second, third and fourth post-input stop sections.

In the above double-power-supply complex control device, a first inner circulation passage is disposed along outer circumferences of the first, second, third and fourth pre-output stop sections. The first inner circulation passage is in communication with the first pre-output bypass and the second pre-output bypass respectively via a first pre-output inner communication passage and a second pre-output inner communication passage. A second inner circulation passage is disposed along outer circumferences of the first, second, third and fourth pre-input stop sections. The second inner circulation passage is in communication with the first pre-input bypass and the second pre-input bypass respectively via a first pre-input inner communication passage and a second pre-input inner communication passage. A third inner circulation passage is disposed along outer circumferences of the first, second, third and fourth post-output stop sections. The third inner circulation passage is in communication with the first post-output bypass and the third post-output bypass respectively via a first post-output inner communication passage and a second post-output inner communication passage. A fourth inner circulation passage is disposed along outer circumferences of the first, second, third and fourth post-input stop sections. The fourth inner circulation passage is in communication with the first post-input bypass and the third post-input bypass respectively via a first post-input inner communication passage and a second post-input inner communication passage.

In the above double-power-supply complex control device, a first lower annular groove is disposed on one side of the first lower flow guide window of the first switch member distal from the first upper flow guide window. A first lower ring section is disposed in the first lower annular groove. A first middle annular groove is disposed between the first lower flow guide window and the first upper flow guide window. A first middle ring section is disposed in the first middle annular groove. A first upper annular groove is disposed on one side of the first upper flow guide window distal from the first lower flow guide window. A first upper ring section is disposed in the first upper annular groove. Two first lower longitudinal grooves are respectively disposed on two sides of the first lower flow guide window in communication with the first lower annular groove and the first middle annular groove. A first lower longitudinal sealing section is disposed in each first lower longitudinal groove. Two first upper longitudinal grooves are respectively disposed on two sides of the first upper flow guide window in communication with the first middle annular groove and the first upper annular groove. A first upper longitudinal sealing section is disposed in each first upper longitudinal groove. The first upper ring section, the first middle ring section and the first lower ring section and the first upper longitudinal sealing section and the first lower longitudinal sealing section are respectively sealedly positioned between the first switch member and inner wall of the first main flow way so as to provide excellent elastic sealing effect along peripheries of the first upper flow guide window and the first lower flow guide window. The second, third and fourth switch members have the same structure as the first switch member.

In the above double-power-supply complex control device, the first upper ring section, the first middle ring section and the first lower ring section and the first upper longitudinal sealing section and the first lower longitudinal sealing section are at least partially integrally formed.

In the above double-power-supply complex control device, the second control section is disposed on one side of the first control section. A transverse borderline as a basis is defined between the first control section and the second control section. The first, second, third and fourth pre-input bypasses and the first, second, third and fourth pre-output bypasses are such arranged that the first, second, third and fourth pre-input bypasses are reflections of the first, second, third and fourth pre-output bypasses with respect to the transverse borderline, The third and fourth control sections are respectively disposed on the same side of the first and second control sections. A longitudinal borderline as a basis is defined between the first and second control sections and the third and fourth control sections. The first, second, third and fourth post-output bypasses and the first, second, third and fourth pre-output bypasses are such arranged that the first, second, third and fourth post-output bypasses are reflections of the first, second, third and fourth pre-output bypasses with respect to the longitudinal borderline. The first, second, third and fourth post-input bypasses and the first, second, third and fourth pre-input bypasses are such arranged that the first, second, third and fourth post-input bypasses are reflections of the first, second, third and fourth pre-input bypasses with respect to the longitudinal borderline.

In the above double-power-supply complex control device, the main body is composed of a seat body and a cover body mated and assembled with each other. The first, second, third and fourth main flow ways are respectively disposed in the seat body. A first annular flange, a second annular flange, a third annular flange and a fourth annular flange are respectively disposed along an inner circumference of one end of the first, second, third and fourth main flow ways distal from the cover body. A first drive shaft rod, a second drive shaft rod, a third drive shaft rod and a fourth drive shaft rod are respectively disposed on the first, second, third and fourth switch members. The first, second, third and fourth drive shaft rods outward protrude from the main body. The first, second, third and fourth annular flanges respectively abut against one end of the first, second, third and fourth switch members, which end is distal from the first, second, third and fourth drive shaft rods. The cover body is cooperatively sealedly capped on one end of the first, second, third and fourth switch members, on which end the first, second, third and fourth drive shaft rods are disposed, whereby the first, second, third and fourth drive shaft rods respectively pass through the cover body to protrude outward so that the first, second, third and fourth switch members are movably restricted within the first, second, third and fourth control sections of the main body.

In the above double-power-supply complex control device, a linking assembly is disposed on outer side of the main body. The linking assembly includes a first linking member, a second linking member, a third linking member and a fourth linking member, which are respectively connected with the first, second, third and fourth switch members so as to synchronously drive the first, second, third and fourth switch members.

In the above double-power-supply complex control device, the first main flow way is in communication with a pre-output passage of a pre-power device for outputting a fluid and the second main flow way is in communication with a pre-input passage of the pre-power device for inputting the fluid, while the third main flow way is in communication with a post-output passage of a post-power device for outputting the fluid and the fourth main flow way is in communication with a post-input passage of the post-power device for inputting the fluid, the first and second load flow ways being in communication with a load.

The double-power-supply complex control device of the present invention has the advantages as follows:

The double-power-supply complex control device of the present invention includes a main body. A first control section, a second control section, a third control section and a fourth control section are respectively disposed in the main body. A first main flow way, a second main flow way, a third main flow way and a fourth main flow way are respectively correspondingly disposed in the first, second, third and fourth control sections. The first and second main flow ways are respectively in communication with a fluid output passage and a fluid input passage of a pre-power device. The third and fourth main flow ways are respectively in communication with a fluid output passage and a fluid input passage of a post-power device. A circumference of the first main flow way is sequentially in communication with a first pre-output bypass, a second pre-output bypass, a third pre-output bypass and a fourth pre-output bypass. A circumference of the second main flow way is sequentially in communication with a first pre-input bypass, a second pre-input bypass, a third pre-input bypass and a fourth pre-input bypass. A circumference of the third main flow way is sequentially in communication with a first post-output bypass, a second post-output bypass, a third post-output bypass and a fourth post-output bypass. A circumference of the fourth main flow way is sequentially in communication with a first post-input bypass, a second post-input bypass, a third post-input bypass and a fourth post-input bypass.

The first pre-output bypass is in communication with the first pre-input bypass. The first post-output bypass is in communication with the first post-input bypass. The fourth pre-output bypass is in communication with the fourth post-input bypass. The second and fourth post-output bypasses and the third pre-output bypass are in communication with a first load flow way. The third and fourth pre-input bypasses and the second post-input bypass are in communication with a second load flow way. The first and second load flow ways are in communication with a load. A switch assembly is composed of a first switch member, a second switch member, a third switch member and a fourth switch member, which are respectively disposed in the first, second, third and fourth main flow ways. A first flow guide passage, a second flow guide passage, a third flow guide passage and a fourth flow guide passage are respectively correspondingly disposed in the first, second, third and fourth switch members in communication with the first, second, third and fourth main flow ways. The first, second, third and fourth flow guide passages are further respectively correspondingly formed with a first lower flow guide window, a second lower flow guide window, a third lower flow guide window and a fourth lower flow guide window in communication with the first, second, third and fourth flow guide passages. When the switch members are operated under external force, the first, second, third and fourth lower flow guide windows are switchable between the respective bypasses to selectively communicate with the bypasses so as to form various fluid transfer paths in the main body. Therefore, the pre-power device and the post-power device can be used to solely or together drive the load to achieve various control effects. The control sections, the switch assembly and the relevant flow ways are all integrated and arranged in one single main body so that the structure is greatly simplified and the volume of the product is minified and the conformity of the product is enhanced. Also, the qualification rate of the product is easy to control and the product has excellent reliability.

The double-power-supply complex control device of the present invention has another advantage that the respective bypasses of the first and second control sections can be such positioned and arranged on the main body that the bypasses are reflections of each other and the respective bypasses of the third and fourth control sections and the first and second control sections can be such positioned and arranged on the main body that the bypasses are reflections of each other. The first, second, third and fourth switch members are respectively mounted in the corresponding control sections. A linking assembly is used to drive the first, second, third and fourth switch members so as to switch the switch members between the respective bypasses. The linking assembly is composed of a first linking member, a second linking member, a third linking member and a fourth linking member disposed on outer side of the main body. The first, second, third and fourth linking members are connected with the first, second, third and fourth switch members, whereby the first, second, third and fourth linking members are in direct or indirect contact with the first, second, third and fourth switch members to drive the switch members. Therefore, the entire structure and driving manner are simplified.

The present invention can be best understood through the following description and accompanying drawings, wherein:

Figure 1:
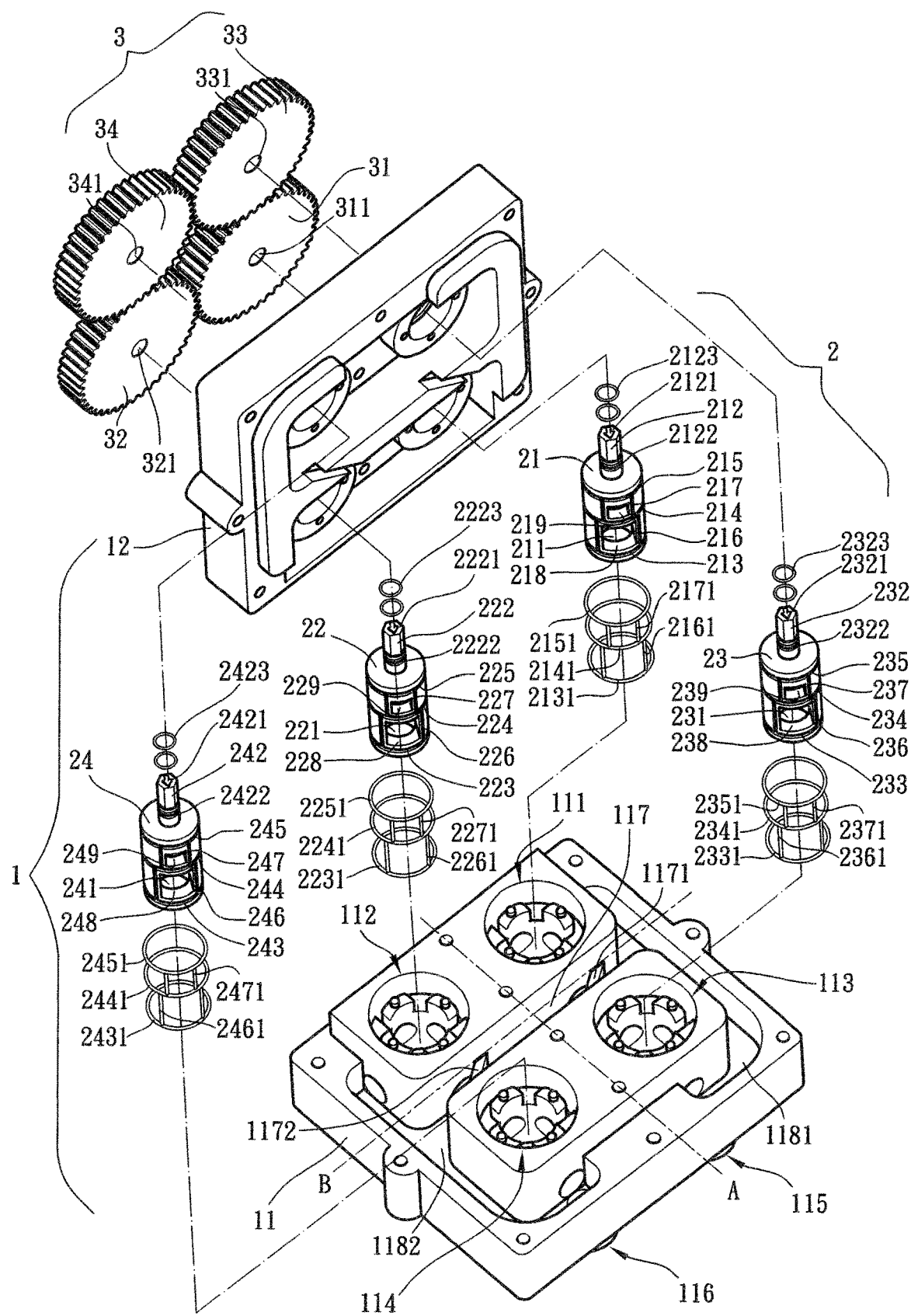
FIG. 1 is a perspective fully exploded view of the present invention.
Figure 2:
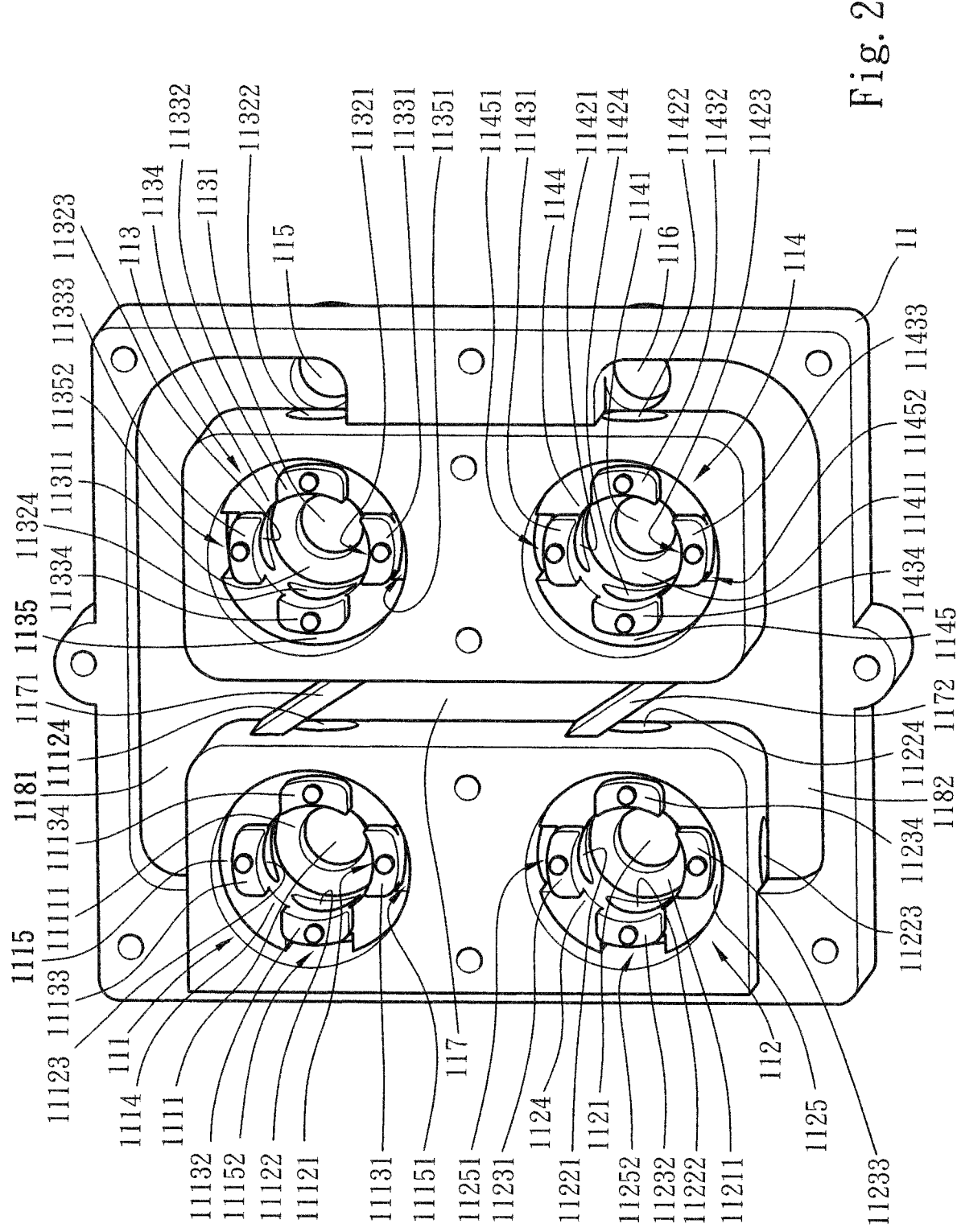
FIG. 2 is a perspective view of the base seat of the present invention.
Figure 3:
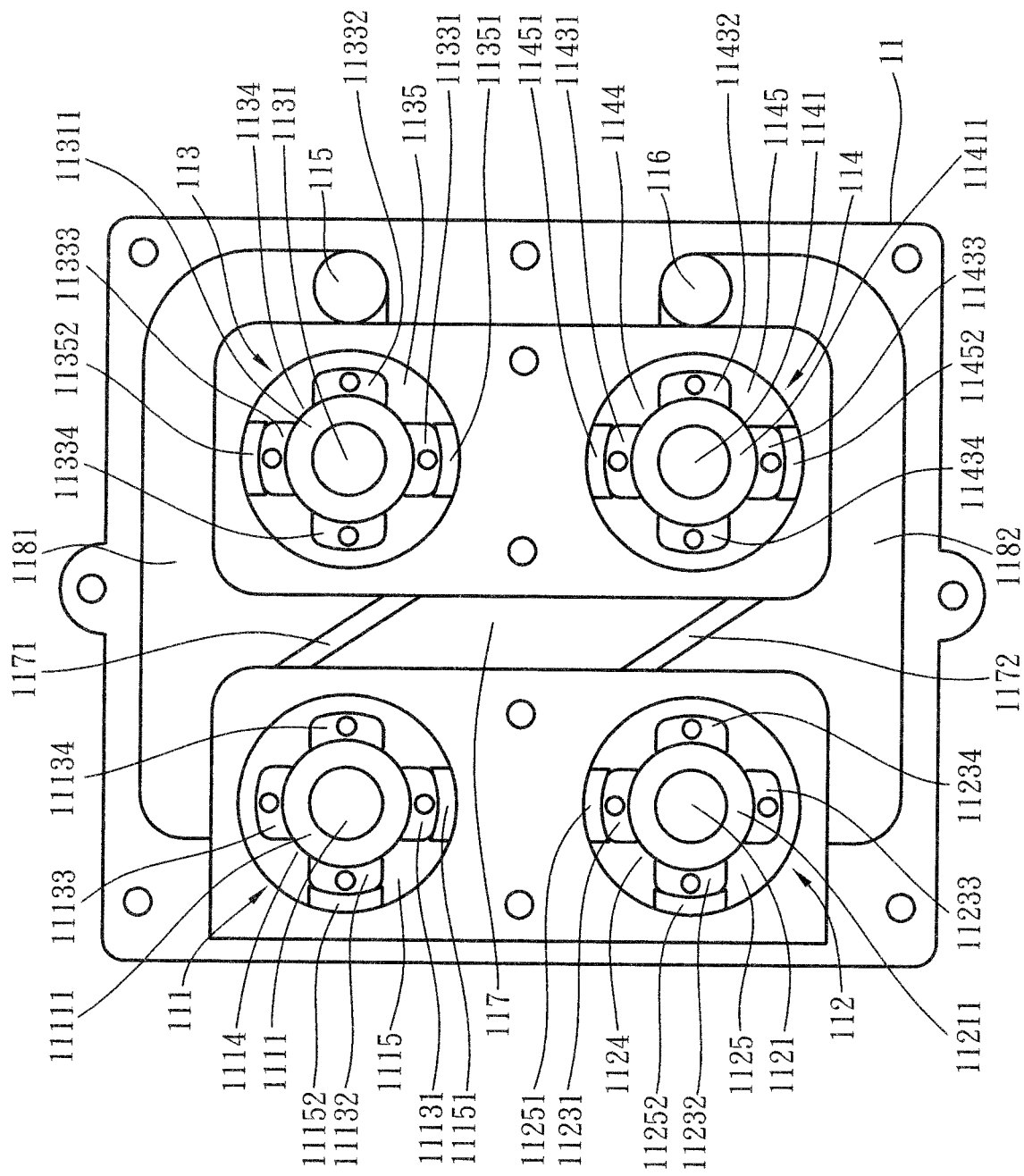
FIG. 3 is a top plane view of the base seat of the present invention.

Reference numbers of drawings: 1 main body; 11 seat body; 111 first control section; 1111 first main flow way; 11111 first annular flange; 11121 first pre-output bypass; 11122 second pre-output bypass; 11123 third pre-output bypass; 11124 fourth pre-output bypass; 11131 first pre-output stop section; 11132 second pre-output stop section; 11133 third pre-output stop section; 11134 fourth pre-output stop section; 1114 first communication opening; 1115 first inner circulation passage; 11151 first pre-output inner communication passage; 11152 second pre-output inner communication passage; 112 second control section; 1121 second main flow way; 11211 second annular flange; 11221 first pre-input bypass; 11222 second pre-input bypass; 11223 third pre-input bypass 11224 fourth pre-input bypass; 11231 first pre-input stop section; 11232 second pre-input stop section; 11233 third pre-input stop section; 11234 fourth pre-input stop section; 1124 second communication opening; 1125 second inner circulation passage 11251; first pre-input inner communication passage 11252 second pre-input inner communication passage; 113 third control section 1131 third main flow way; 11311 third annular flange; 11321 first post-output bypass; 11322 second post-output bypass; 11323 third post-output bypass; 11324 fourth post-output bypass; 11331 first post-output stop section; 11332 second post-output stop section; 11333 third post-output stop section; 11334 fourth post-output stop section; 1134 third communication opening; 1135 third inner circulation passage; 11351 first post-output inner communication passage; 11352 second post-output inner communication passage 114 fourth control section; 1141 further main flow way; 11411 fourth annular flange; 11421 first post-input bypass; 11422 second post-input bypass; 11423 third post-input bypass; 11424 fourth post-input bypass; 11431 first post-input stop section; 11432 second post-input stop section; 11433 third post-input stop section; 11434 fourth post-input stop section; 1144 fourth communication opening 1145 fourth inner circulation passage; 11451 first post-input inner communication passage; 11452 second post-input inner communication passage; 115 first load flow way; 116 second load flow way; 117 communication oblique passage; 1171-1172 lateral stop sections 1181 first transverse passage; 1182 second transverse passage 1191 first longitudinal passage; 1192 second longitudinal passage 12 cover body; 2 switch member; 21 first switch member; 211 first flow guide passage; 212 drive shaft rod; 2121 first mark section 2122 first annular groove; 2123 first ring member; 213 first lower annular groove; 2131 first lower ring section; 214 first middle annular groove; 2141 first middle ring section; 215 first upper annular groove; 2151 first upper ring section; 216 first lower longitudinal groove; 2161 first lower longitudinal sealing section; 217; 2171 first upper longitudinal groove; 218 first lower flow guide window; 219 first upper flow guide window; 22 second switch member; 221 second flow guide passage; 222 second drive shaft rod 2221 second mark section; 2222 second annular groove; 2223 second ring member; 223 second lower annular groove; 2231 second lower ring section; 224 second middle annular groove; 2241 second middle ring section; 225 second upper annular groove; 2251 second upper ring section; 226 second lower longitudinal groove; 2261 second lower longitudinal sealing section; 227 second upper longitudinal groove; 2271 second upper longitudinal sealing section; 228 second lower flow guide window; 229 second upper flow guide window; 23 third switch member; 231 third flow guide passage; 232 third drive shaft rod; 2321 third mark section; 2322 third annular groove; 2323 third ring member; 233 third lower annular groove; 2331 third lower ring section; 234 third middle annular grooves; 2341 third middle ring section; 235 third upper annular groove; 2351 third upper ring section; 236 third lower longitudinal groove; 2361 lower longitudinal sealing section; 237 third upper longitudinal groove; 2371 third upper longitudinal sealing section; 238 third lower flow guide window; 239 third upper flow guide window; 24 fourth switch member; 241 fourth flow guide passage; 242 fourth drive shaft rod 2421 fourth mark section; 2422 fourth annular groove; 2423 fourth ring member; 243 fourth lower annular groove; 2431 fourth lower ring section; 244 fourth middle annular groove; 2441 fourth middle ring section; 245 fourth upper annular groove; 2451 fourth upper ring section; 246 fourth lower longitudinal groove; 2461 fourth lower longitudinal sealing section; 247 fourth upper longitudinal groove; 2471 fourth upper longitudinal sealing section; 248 fourth lower flow guide window; 249 fourth upper flow guide window; 3 linking assembly; 31 first linking member; 32 second linking member; 33 third linking member; 34 fourth linking member; 311 first through hole 321 second through hole; 331 third through hole; 341 fourth through hole; 4 pre-power device; 41 pre-output passage; 42 pre-input passage; 5 post-power device; 51 post-output passage; 52 post-input passage; 6 load; 61 first load passage; 62 second load passage A transverse borderline; B longitudinal borderline.

DETAILED DESCRIPTION OF THE PREFERRED EMBODIMENTS

Please refer to FIGS. 1 to 7. The double-power-supply complex control device of the present invention includes a main body 1 and a switch assembly 2. The main body 1 is composed of a seat body 11 and a cover body 12. A first control section 111, a second control section 112, a third control section 113 and a fourth control section 114 are disposed in the seat body 11. A first main flow way 1111 is disposed at a center of the first control section 111 to pass through the seat body 11. A first annular flange 11111 is disposed along an inner circumference of one end of the first main flow way 1111. An outer circumference of a middle section of the first main flow way 1111 is sequentially in communication with a first pre-output bypass 11121, a second pre-output bypass 11122, a third pre-output bypass 11123 and a fourth pre-output bypass 11124. Along an outer circumference of one end of the first main flow way 1111, which end is distal from the first annular flange 11111, are sequentially disposed a first pre-output stop section 11131 corresponding to the first pre-output bypass 11121, a second pre-output stop section 11132 corresponding to the second pre-output bypass 11122, a third pre-output stop section 11133 corresponding to the third pre-output bypass 11123 and a fourth pre-output stop section 11134 corresponding to the fourth pre-output bypass 11124.

A first communication opening 1114 is respectively disposed between the first pre-output stop section 11131, the second pre-output stop section 11132, the third pre-output stop section 11133 and the fourth pre-output stop section 11134. Each first communication opening 1114 is in communication with a first inner circulation passage 1115 disposed along outer circumferences of the first pre-output stop section 11131, the second pre-output stop section 11132, the third pre-output stop section 11133 and the fourth pre-output stop section 11134. The first inner circulation passage 1115 is in communication with the first pre-output bypass 11121 and the second pre-output bypass 11122 respectively via a first pre-output inner communication passage 11151 and a second pre-output inner communication passage 11152.

A second main flow way 1121 is disposed at a center of the second control section 112 to pass through the seat body 11. A second annular flange 11211 is disposed along an inner circumference of one end of the second main flow way 1121. An outer circumference of a middle section of the second main flow way 1121 is sequentially in communication with a first pre-input bypass 11221, a second pre-input bypass 11222, a third pre-input bypass 11223 and a fourth pre-input bypass 11224. Along an outer circumference of one end of the second main flow way 1121, which end is distal from the second annular flange 11211, are sequentially disposed a first pre-input stop section 11231 corresponding to the first pre-input bypass 11221, a second pre-input stop section 11232 corresponding to the second pre-input bypass 11222, a third pre-input stop section 11233 corresponding to the third pre-input bypass 11223 and a fourth pre-input stop section 11234 corresponding to the fourth pre-input bypass 11224.

A second communication opening 1124 is respectively disposed between the first pre-input stop section 11231, the second pre-input stop section 11232, the third pre-input stop section 11233 and the fourth pre-input stop section 11234. Each second communication opening 1124 is in communication with a second inner circulation passage 1125 disposed along outer circumferences of the first pre-input stop section 11231, the second pre-input stop section 11232, the third pre-input stop section 11233 and the fourth pre-input stop section 11234. The second inner circulation passage 1125 is in communication with the first pre-input bypass 11221 and the second pre-input bypass 11222 respectively via a first pre-input inner communication passage 11251 and a second pre-input inner communication passage 11252.

A third main flow way 1131 is disposed at a center of the third control section 113 to pass through the seat body 11. A third annular flange 11311 is disposed along an inner circumference of one end of the third main flow way 1131. An outer circumference of a middle section of the third main flow way 1131 is sequentially in communication with a first post-output bypass 11321, a second post-output bypass 11322, a third post-output bypass 11323 and a fourth post-output bypass 11324. Along an outer circumference of one end of the third main flow way 1131, which end is distal from the third annular flange 11311, are sequentially disposed a first post-output stop section 11331 corresponding to the first post-output bypass 11321, a second post-output stop section 11332 corresponding to the second post-output bypass 11322, a third post-output stop section 11333 corresponding to the third post-output bypass 11323 and a fourth post-output stop section 11334 corresponding to the fourth post-output bypass 11324.

A third communication opening 1134 is respectively disposed between the first post-output stop section 11331, the second post-output stop section 11332, the third post-output stop section 11333 and the fourth post-output stop section 11334. Each third communication opening 1134 is in communication with a third inner circulation passage 1135 disposed along outer circumferences of the first post-output stop section 11331, the second post-output stop section 11332, the third post-output stop section 11333 and the fourth post-output stop section 11334. The third inner circulation passage 1135 is in communication with the first post-output bypass 11321 and the third post-output bypass 11323 respectively via a first post-output inner communication passage 11351 and a second post-output inner communication passage 11352.

A fourth main flow way 1141 is disposed at a center of the fourth control section 114 to pass through the seat body 11. A fourth annular flange 11411 is disposed along an inner circumference of one end of the fourth main flow way 1141. An outer circumference of a middle section of the fourth main flow way 1141 is sequentially in communication with a first post-input bypass 11421, a second post-input bypass 11422, a third post-input bypass 11423 and a fourth post-input bypass 11424. Along an outer circumference of one end of the fourth main flow way 1141, which end is distal from the fourth annular flange 11411, are sequentially disposed a first post-input stop section 11431 corresponding to the first post-input bypass 11421, a second post-input stop section 11432 corresponding to the second post-input bypass 11422, a third post-input stop section 11433 corresponding to the third post-input bypass 11423 and a fourth post-input stop section 11434 corresponding to the fourth post-input bypass 11424.

A fourth communication opening 1144 is respectively disposed between the first post-input stop section 11431, the second post-input stop section 11432, the third post-input stop section 11433 and the fourth post-input stop section 11434. Each fourth communication opening 1144 is in communication with a fourth inner circulation passage 1145 disposed along outer circumferences of the first post-input stop section 11431, the second post-input stop section 11432, the third post-input stop section 11433 and the fourth post-input stop section 11434. The fourth inner circulation passage 1145 is in communication with the first post-input bypass 11421 and the third post-input bypass 11423 respectively via a first post-input inner communication passage 11451 and a second post-input inner communication passage 11452.

The second control section 112 is disposed on one side of the first control section 111. A transverse borderline A as a basis is defined between the first control section 111 and the second control section 112 (as shown in FIG. 1). The first pre-input bypass 11221, the second pre-input bypass 11222, the third pre-input bypass 11223 and the fourth pre-input bypass 11224 and the first pre-output bypass 11121, the second pre-output bypass 11122, the third pre-output bypass 11123 and the fourth pre-output bypass 11124 are such positioned that the first pre-input bypass 11221, the second pre-input bypass 11222, the third pre-input bypass 11223 and the fourth pre-input bypass 11224 are reflections of the first pre-output bypass 11121, the second pre-output bypass 11122, the third pre-output bypass 11123 and the fourth pre-output bypass 11124 with respect to the transverse borderline A.

The third control section 113 is disposed on one side of the first control section 111. The fourth control section 114 is disposed on the same side of the second control section 112 corresponding to the position of the third control section 113. A longitudinal borderline B as a basis is defined between the first control section 111 and the third control section 113 and between the second control section 112 and the fourth control section 114 (as shown in FIG. 1). The first post-output bypass 11321, the second post-output bypass 11322, the third post-output bypass 11323 and the fourth post-output bypass 11324 and the first pre-output bypass 11121, the second pre-output bypass 11122, the third pre-output bypass 11123 and the fourth pre-output bypass 11124 are such positioned that the first post-output bypass 11321, the second post-output bypass 11322, the third post-output bypass 11323 and the fourth post-output bypass 11324 are reflections of the first pre-output bypass 11121, the second pre-output bypass 11122, the third pre-output bypass 11123 and the fourth pre-output bypass 11124 with respect to the longitudinal borderline B. The first post-input bypass 11421, the second post-input bypass 11422, the third post-input bypass 11423 and the fourth post-input bypass 11424 and the first pre-input bypass 11221, the second pre-input bypass 1122, the third pre-input bypass 11223 and the fourth pre-input bypass 11224 are such positioned that the first post-input bypass 11421, the second post-input bypass 11422, the third post-input bypass 11423 and the fourth post-input bypass 11424 are reflections of the first pre-input bypass 11221, the second pre-input bypass 1122, the third pre-input bypass 11223 and the fourth pre-input bypass 11224 with respect to the longitudinal borderline B.

Figure 4:
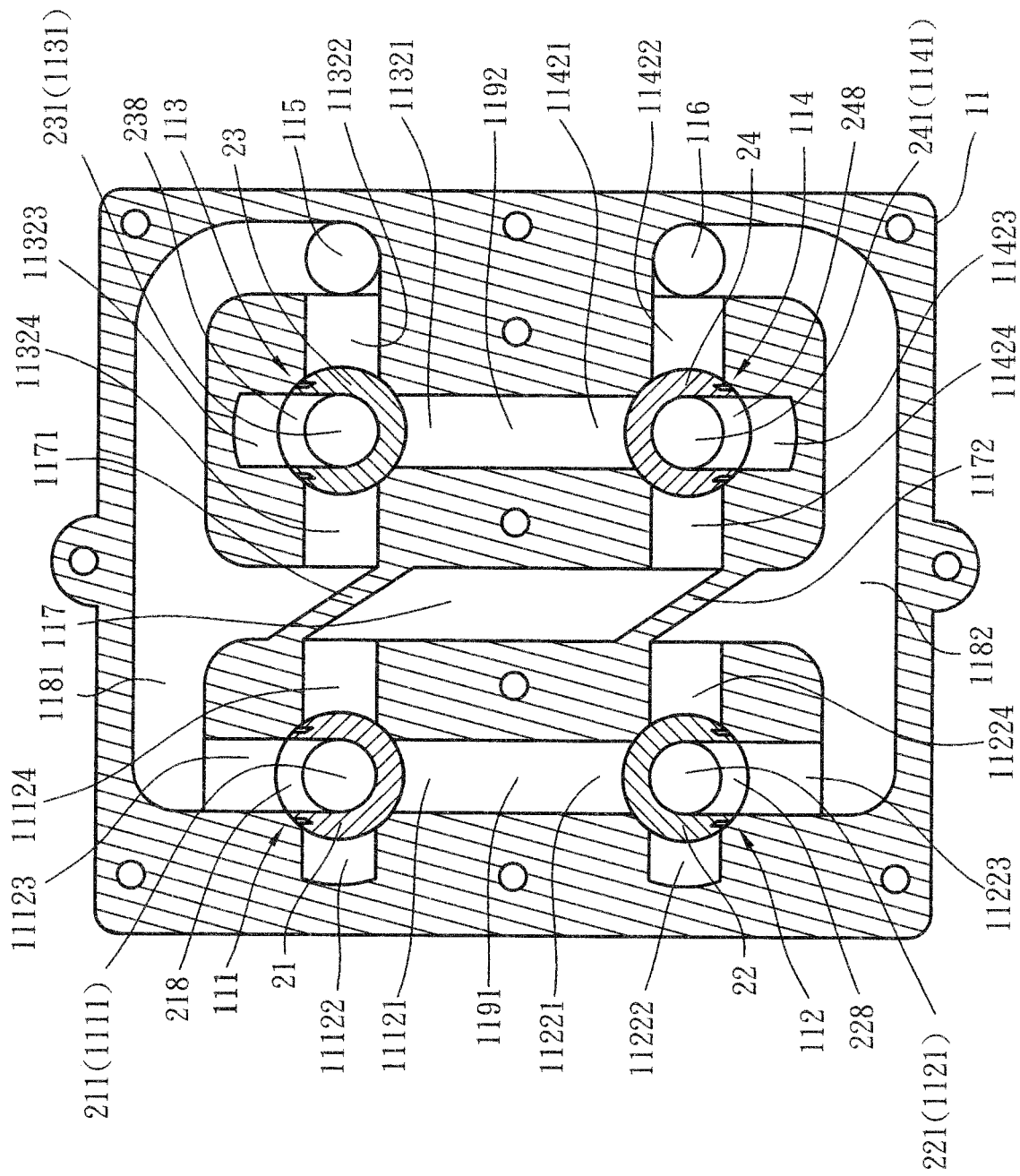
FIG. 4 is a horizontal transverse sectional view taken along the height of the portions of the respective bypasses of the base seat of the present invention.
Figure 5:
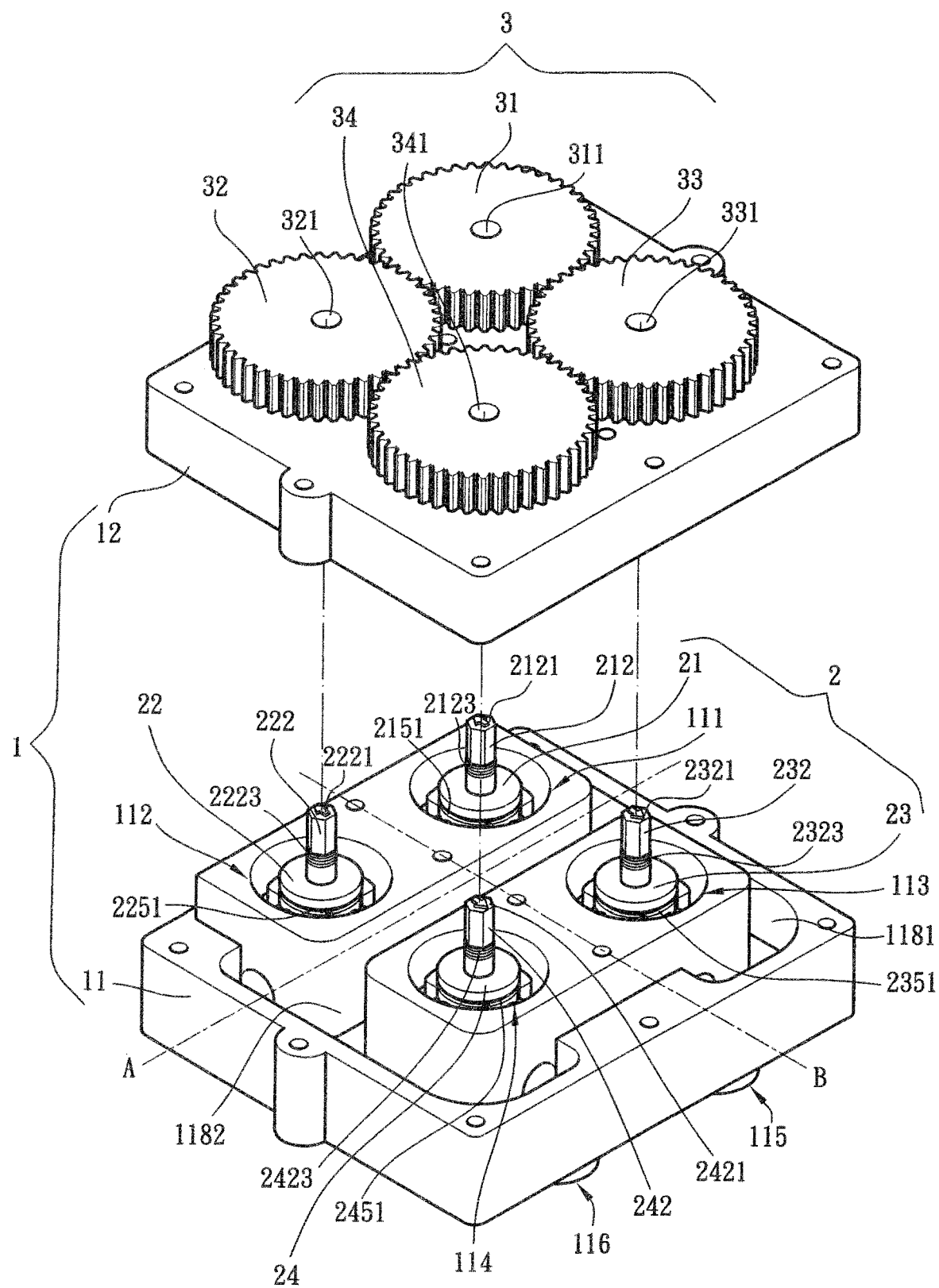
FIG. 5 is a partially perspective assembled view of the present invention.
Figure 6:
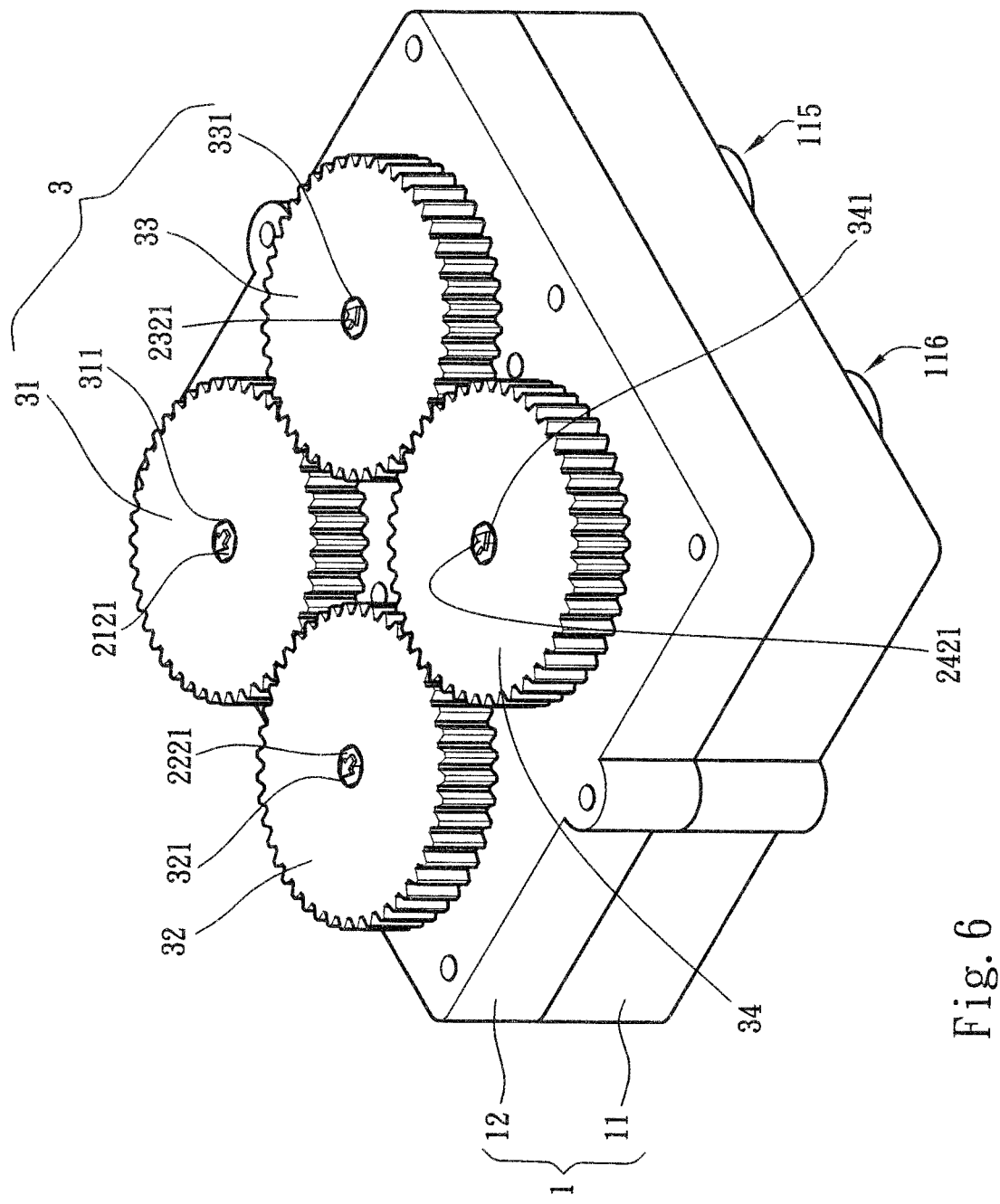
FIG. 6 is a fully perspective assembled view of the present invention.
Figure 7:
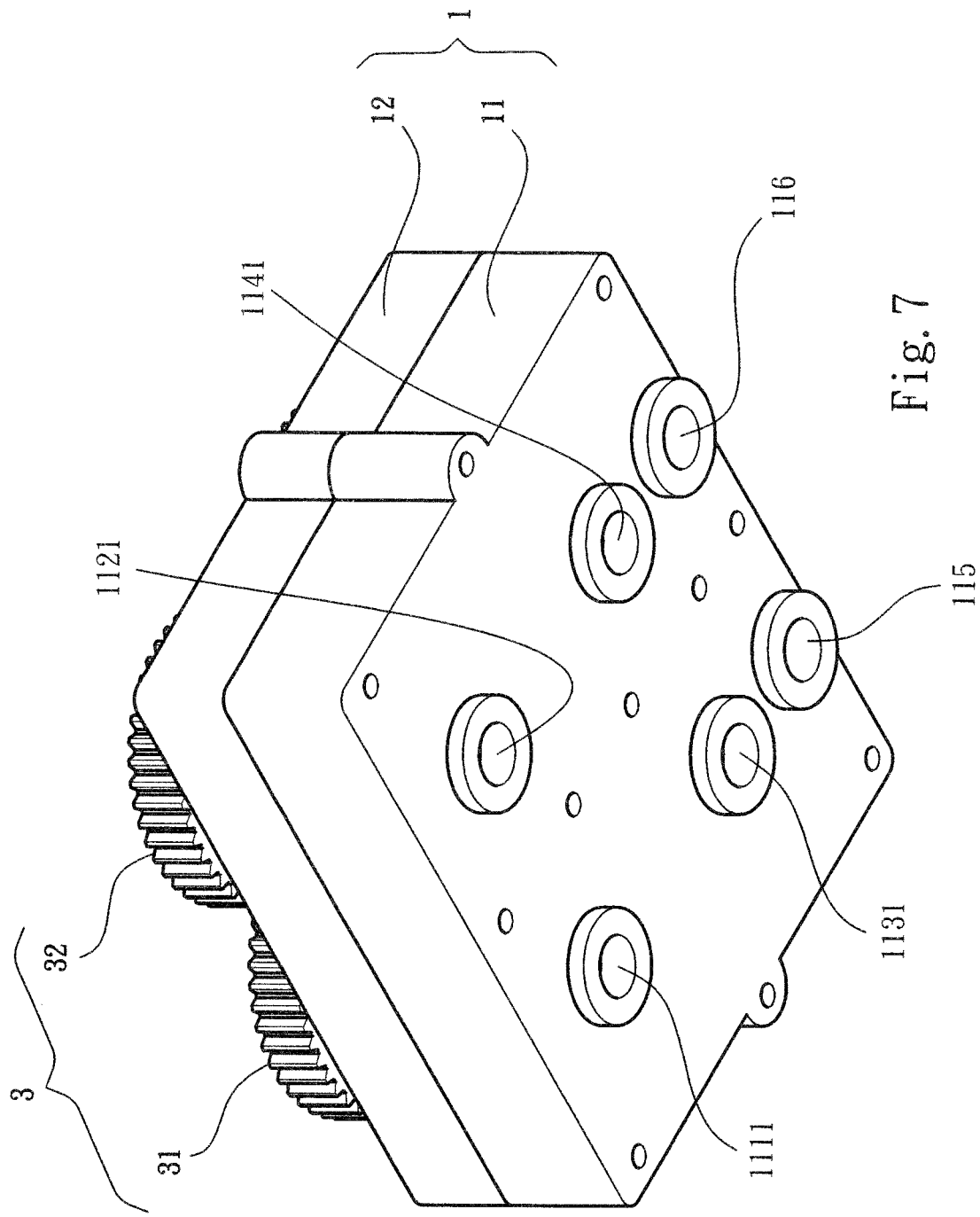
FIG. 7 is a bottom perspective assembled view of the present invention.

Please refer to FIG. 4. The first pre-output bypass 11121 is in communication with the first pre-input bypass 11221. The first post-output bypass 11321 is in communication with the first post-input bypass 11421. The fourth pre-output bypass 11124 is in communication with the fourth post-input bypass 11424. The third pre-output bypass 11123, the fourth post-output bypass 11324 and the second post-output bypass 11322 are in communication with a first load flow way 115. The third pre-input bypass 11223, the fourth pre-input bypass 11224 and the second post-input bypass 11422 are in communication with a second load flow way 116.

In a preferred embodiment, the first pre-output bypass 11121 is in communication with the first pre-input bypass 11221 via a first longitudinal passage 1191. The first post-output bypass 11321 is in communication with the first post-input bypass 11421 via a second longitudinal passage 1192. In addition, two lateral stop sections 1171, 1172 are respectively disposed on two sides of a junction between the fourth pre-output bypass 11124 and the fourth post-input bypass 11424 to form a communication oblique passage 117. The third pre-output bypass 11123, the fourth post-output bypass 11324 and the second post-output bypass 11322 are all in communication with the first load flow way 115 via a first transverse passage 1181.

The third pre-input bypass 11223, the fourth pre-input bypass 11224 and the second post-input bypass 11422 are all in communication with the second load flow way 116 via a second transverse passage 1182. Please refer to FIG. 1. The cover body 12 is capped on one side of the seat body 11 distal from the first, second, third and fourth annular flanges 11111, 11211, 11311, 11411 to form a main body 1.

The switch assembly 2 is composed of a first switch member 21, a second switch member 22, a third switch member 23 and a fourth switch member 24, which are identical to each other. The first, second, third and fourth switch members 21, 22, 23, 24 are respectively disposed in the first, second, third and fourth main flow ways 1111, 1121, 1131, 1141. A first flow guide passage 211, a second flow guide passage 221, a third flow guide passage 231 and a fourth flow guide passage 241 are respectively formed in the first, second, third and fourth switch members 21, 22, 23, 24. Each of the first, second, third and fourth flow guide passage 211, 221, 231, 241 has an opening at one end of each of the first, second, third and fourth switch members 21, 22, 23, 24 in communication with the first, second, third and fourth main flow ways 1111, 1121, 1131, 1141.

A first axially extending drive shaft rod 212, a second axially extending drive shaft rod 222, a third axially extending drive shaft rod 232 and a fourth axially extending drive shaft rod 242 are respectively disposed at one end of the first, second, third and fourth switch members 21, 22, 23, 24, which end is distal from the opening of the first, second, third and fourth flow guide passage 211, 221, 231, 241. The first, second, third and fourth drive shaft rods 212, 222, 232, 242 respectively pass through the cover body 12 and outward protrude from the main body 1. In addition, at least one first annular groove 2122, second annular groove 2222, third annular groove 2322 and fourth annular groove 2422 are respectively disposed on circumferences of the first, second, third and fourth drive shaft rods 212, 222, 232, 242. A first ring member 2123, a second ring member 2223, a third ring member 2323 and a fourth ring member 2423 are respectively inlaid in the first, second, third and fourth annular grooves 2122, 2222, 2322, 2422. The first, second, third and fourth ring members 2123, 2223, 2323, 2423 serve to provide sealing effect between the circumferences of the first, second, third and fourth drive shaft rods 212, 222, 232, 242 and the cover body 12.

A first lower annular groove 213, a second lower annular groove 223, a third lower annular groove 233 and a fourth lower annular groove 243 and a first middle annular groove 214, a second middle annular groove 224, a third middle annular groove 234 and a fourth middle annular groove 244 and a first upper annular groove 215, a second upper annular groove 225, a third upper annular groove 235 and a fourth upper annular groove 245 are sequentially respectively disposed on the outer circumferences of the first, second, third and fourth switch members 21, 22, 23, 24 from one end proximal to the opening of the first, second, third and fourth flow guide passage 211, 221, 231, 241 to the other end. A first lower flow guide window 218, a second lower flow guide window 228, a third lower flow guide window 238 and a fourth lower flow guide window 248 are respectively formed between the first, second, third and fourth lower annular grooves 213, 223, 233, 243 and the first, second, third and fourth middle annular grooves 214, 224, 234, 244. A first upper flow guide window 219, a second upper flow guide window 229, a third upper flow guide window 239 and a fourth upper flow guide window 249 are respectively formed between the first, second, third and fourth middle annular grooves 214, 224, 234, 244 and the first, second, third and fourth upper annular grooves 215, 225, 235, 245. The first, second, third and fourth lower flow guide windows 218, 228, 238, 248 and the first, second, third and fourth upper flow guide windows 219, 229, 239, 249 are respectively in communication with the first, second, third and fourth flow guide passage 211, 221, 231, 241.

As necessary, a first mark section 2121, a second mark section 2221, a third mark section 2321 and a fourth mark section 2421 can be respectively disposed on an end face of the first, second, third and fourth drive shaft rods 212, 222, 232, 242 extending out of the main body 1. The first, second, third and fourth mark sections 2121, 2221, 2321, 2421 serve to indicate the directions of the first, second, third and fourth lower flow guide windows 218, 228, 238, 248 and the first, second, third and fourth upper flow guide windows 219, 229, 239, 249. In addition, two first lower longitudinal grooves 216, two second lower longitudinal grooves 226, two third lower longitudinal grooves 236 and two fourth lower longitudinal grooves 246 are respectively disposed on two sides of the first, second, third and fourth lower flow guide windows 218, 228, 238, 248 in communication with the first, second, third and fourth lower annular grooves 213, 223, 233, 243 and the first, second, third and fourth middle annular grooves 214, 224, 234, 244. Two first upper longitudinal grooves 217, two second upper longitudinal grooves 227, two third upper longitudinal grooves 237 and two fourth upper longitudinal grooves 247 are respectively disposed on two sides of the first, second, third and fourth upper flow guide windows 219, 229, 239, 249 in communication with the first, second, third and fourth middle annular grooves 214, 224, 234, 244 and the first, second, third and fourth upper annular grooves 215, 225, 235, 245.

A first lower ring section 2131, a second lower ring section 2231, a third lower ring section 2331 and a fourth lower ring section 2431 and a first middle ring section 2141, a second middle ring section 2241, a third middle ring section 2341 and a fourth middle ring section 2441 and a first upper ring section 2151, a second upper ring section 2251, a third upper ring section 2351 and a fourth upper ring section 2451 are respectively correspondingly disposed in the first, second, third and fourth lower annular grooves 213, 223, 233, 243 and the first, second, third and fourth middle annular grooves 214, 224, 234, 244 and the first, second, third and fourth upper annular grooves 215, 225, 235, 245 on the outer circumferences of the first, second, third and fourth switch members 21, 22, 23, 24. Two first lower longitudinal sealing sections 2161, two second lower longitudinal sealing sections 2261, two third lower longitudinal sealing sections 2361 and two fourth lower longitudinal sealing sections 2461 are respectively disposed between the first, second, third and fourth lower ring sections 2131, 2231, 2331, 2431 and the first, second, third and fourth middle ring sections 2141, 2241, 2341, 2441. Two first upper longitudinal sealing sections 2171, two second upper longitudinal sealing sections 2271, two third upper longitudinal sealing sections 2371 and two fourth upper longitudinal sealing sections 2471 are respectively disposed between the first, second, third and fourth middle ring sections 2141, 2241, 2341, 2441 and the first, second, third and fourth upper ring sections 2151, 2251, 2351, 2451. The first, second, third and fourth lower longitudinal sealing sections 2161, 2261, 2361, 2461 and the first, second, third and fourth upper longitudinal sealing sections 2171, 2271, 2371, 2471 are respectively inlaid in the first, second, third and fourth lower longitudinal grooves 216, 226, 236, 246 and the first, second, third and fourth upper longitudinal grooves 217, 227, 237, 247. The first, second, third and fourth lower longitudinal sealing sections 2161, 2261, 2361, 2461 and the first, second, third and fourth upper longitudinal sealing sections 2171, 2271, 2371, 2471 serve to respectively provide excellent elastic sealing effect between the entire peripheries of the first, second, third and fourth lower flow guide windows 218, 228, 238, 248 and the first, second, third and fourth upper flow guide windows 219, 229, 239, 249 and the inner wall of the first, second, third and fourth main flow ways 1111, 1121, 1131, 1141.

In the above structure, the first, second, third and fourth annular flanges 11111, 11211, 11311, 11411 respectively abut against the end faces of the first, second, third and fourth switch members 21, 22, 23, 24 with the openings of the first, second, third and fourth flow guide passage 211, 221, 231, 241. The cover body 21 is cooperatively sealedly mated with one side of the seat body 11 distal from the first, second, third and fourth annular flanges 11111, 11211, 11311, 11411, whereby the first, second, third and fourth switch members 21, 22, 23, 24 are operably restricted within the main body 1.

In application, a linking assembly 3 can be disposed on outer side of the main body 1. The linking assembly 3 is composed of a first linking member 31, a second 1 inking member 32, a third linking member 33 and a fourth linking member 34, which are directly or indirectly drivingly connected with each other. Each of the first, second, third and fourth linking members 31, 32, 33, 34 has a first through hole 311, a second through hole 321, a third through hole 331 and a fourth through hole 341, which are respectively securely connected with the first, second, third and fourth drive shaft rods 212, 222, 232, 242. The first, second, third and fourth linking members 31, 32, 33, 34 serve to receive external action force to respectively drive the first, second, third and fourth switch members 21, 22, 23, 24 to operate via the first, second, third and fourth drive shaft rods 212, 222, 232, 242.

In a preferred embodiment, the first, second, third and fourth linking members 31, 32, 33, 34 are circular bodies in contact with each other at a rim, (such as gears engaged with each other, frictional wheels, belts and belt pulleys or any other linking mechanisms capable of synchronously driving each other). Accordingly, when the linking assembly 3 is directly or indirectly operated, the first linking member 31 and the fourth linking member 34 are pivotally rotated in the same direction, while the second and third linking members 32, 33 and the first and fourth linking members 31, 34 are pivotally rotated in reverse directions.

Figure 8:
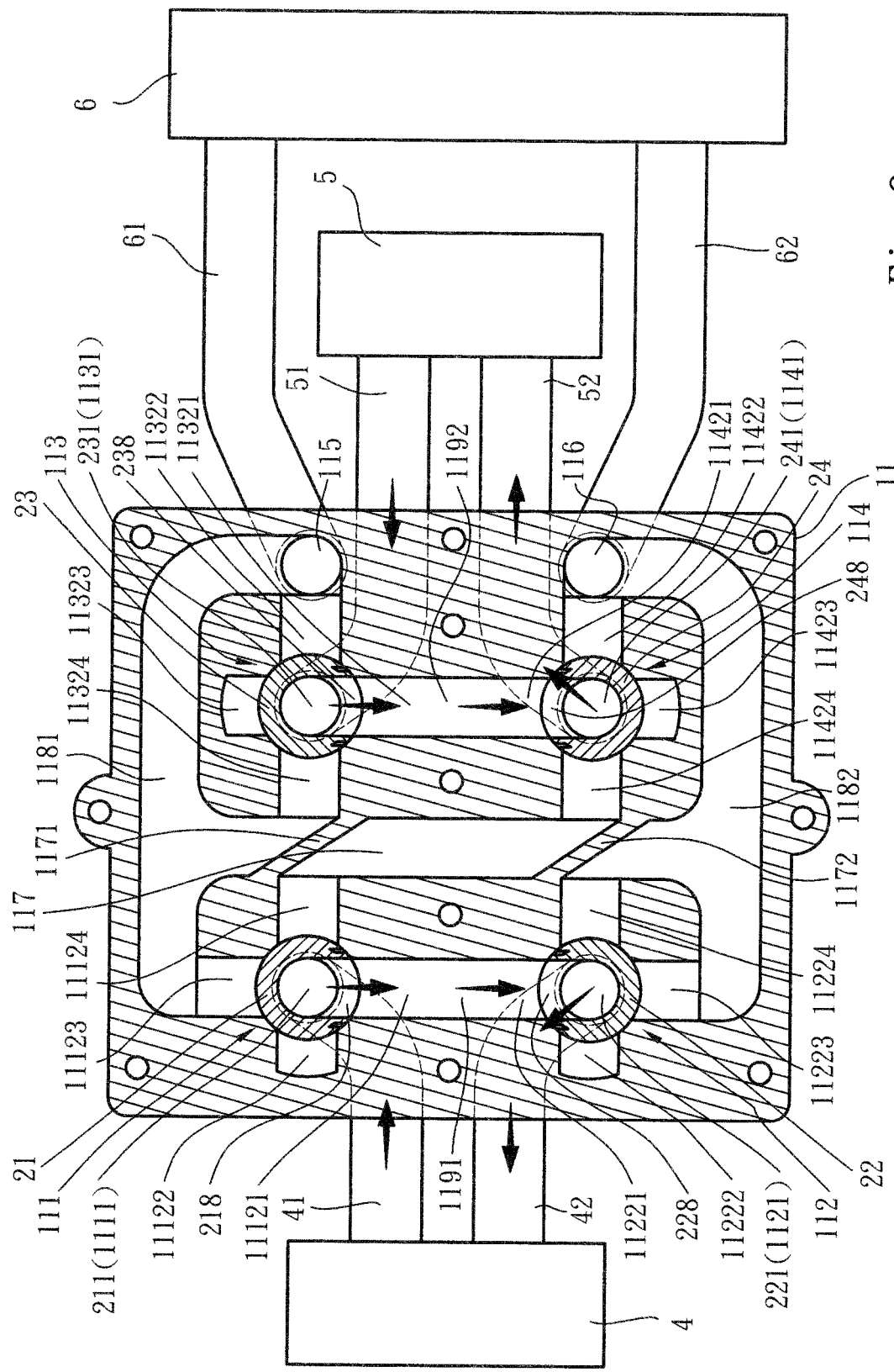
FIG. 8 is a view of a first application of the present invention.

Please refer to FIG. 8, which shows a first application of the above structure of the present invention. When the first, second, third and fourth switch members 21, 22, 23, 24 are such rotated (moved) that the first, second, third and fourth lower flow guide windows 218, 228, 238, 248 are respectively aligned with the first pre-output bypass 11121, the first pre-input bypass 11221, the first post-output bypass 11321 and the first post-input bypass 11421, the fluid flowing out from the pre-output passage 41 of the pre-power device 4 flows through the first main flow way 1111 to sequentially pass through the first flow guide passage 211 and the first lower flow guide window 218 and then sequentially pass through the first pre-output bypass 11121, the first longitudinal passage 1191 and the first pre-input bypass 11221 to flow to the second lower flow guide window 228. Then the fluid sequentially passes through the second flow guide passage 221, the second main flow way 1121 and the pre-input passage 42 to flow back to the pre-power device 4. The fluid flowing out from the post-output passage 51 of the post-power device 5 flows through the third main flow way 1131 to sequentially pass through the third flow guide passage 231 and the third lower flow guide window 238 and then sequentially pass through the first post-output bypass 11321, the second longitudinal passage 1192 and the first post-input bypass 11421 to flow to the fourth lower flow guide window 248. Then the fluid sequentially passes through the fourth flow guide passage 241, the fourth main flow way 1141 and the post-input passage 52 to flow back to the post-power device 5. Accordingly, the pre-power device 4 forms an internal fluid circulation without outputting fluid to the load 6, while the post-power device 5 also forms an internal fluid circulation without outputting fluid to the load 6. In this case, the load 6 is not driven by any fluid and is situated in a state without external driving force.

In the case that the pre-power device 4 is set a power outputting device (such as a vehicle engine) and the post-power device 5 is set another power outputting device (such as an electric motor), while the load 6 is set a device for receiving the power, (such as a transmission case), then both the pre-power device 4 and the post-power device 5 form an independent internal fluid circulation without working. This function is similar to that both the engine and the electric motor of a hybrid electric vehicle provide no power and are situated in a state without driving force.

When the first, second, third and fourth lower flow guide windows 218, 228, 238, 248 are gradually rotated (moved) away from the positions where the first, second, third and fourth lower flow guide windows 218, 228, 238, 248 are respectively aligned with the first pre-output bypass 11121, the first pre-input bypass 11221, the first post-output bypass 11321 and the first post-input bypass 11421 to the positions where the first, second, third and fourth lower flow guide windows 218, 228, 238, 248 are respectively aligned with the second pre-output bypass 11122, the second pre-input bypass 11222, the second post-output bypass 11322 and the second post-input bypass 11422 (or the fourth pre-output bypass 11124, the fourth pre-input bypass 11224, the fourth post-output bypass 11324 and the fourth post-input bypass 11424), the first, second, third and fourth upper flow guide windows 219, 229, 239, 249 are at the same time gradually rotated (moved) away from the positions where the first, second, third and fourth upper flow guide windows 219, 229, 239, 249 are respectively aligned with the first pre-output stop section 11131, the first pre-input stop section 11231, the first post-output stop section 11331 and the first post-output stop section 11431 through the adjacent first, second, third and fourth communication openings 1114, 1124, 1134, 1144 to the positions where the first, second, third and fourth upper flow guide windows 219, 229, 239, 249 are respectively aligned with the second pre-output stop section 11132, the second pre-input stop section 11232, the second post-output stop section 11332 and the second post-input stop section 11432 (or the fourth pre-output stop section 11134, the fourth pre-input stop section 11234, the fourth post-output stop section 11334 and the fourth post-input stop section 11434).

In the above rotation (moving) process, part of the fluid passing through the first flow guide passage 211 will flow through the first upper flow guide window 219 and the first communication opening 1114 into the first inner circulation passage 1115 and then flow through the first pre-output inner communication passage 11151 to sequentially pass through the first pre-output bypass 11121 and the first longitudinal passage 1191 and then flow from the first pre-input bypass 11221 through the first pre-input inner communication passage 11251 into the second inner circulation passage 1125. The fluid then sequentially flows through the second communication opening 1124, the second upper flow guide window 229 and the second flow guide passage 221 to be guided out. Then the fluid flows through the pre-input passage 42 back to the pre-power device 4. Part of the fluid passing through the third flow guide passage 231 will flow through the third upper flow guide window 239 and the third communication opening 1134 into the third inner circulation passage 1135 and then flow through the first post-output inner communication passage 11351 to sequentially pass through the first post-output bypass 11321 and the second longitudinal passage 1192 and then flow from the first post-input bypass 11421 through the first post-input inner communication passage 11451 into the fourth inner circulation passage 1145. The fluid then sequentially flows through the fourth communication opening 1144, the fourth upper flow guide window 249 and the fourth flow guide passage 241 to be guided out. Then the fluid flows through the post-input passage 52 back to the post-power device 5. Accordingly, in the above switching process, the abrupt increase and change of the fluid pressure can be effectively relieved, which abrupt increase and change are caused by the reduction of the area of the flow path when the fluid flows from the respective lower flow guide windows of the flow guide passages to pass through the corresponding bypasses.

Figure 9:
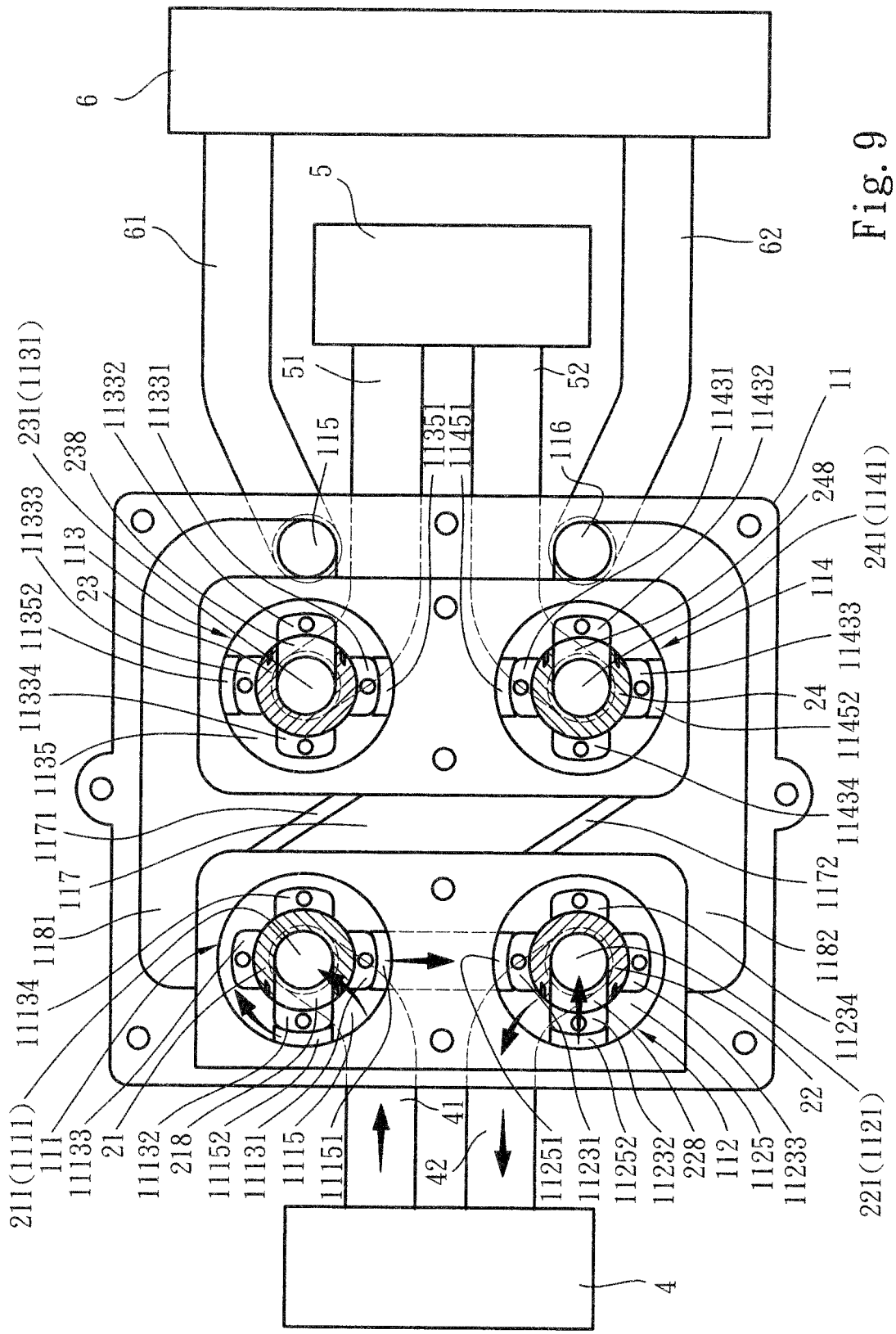
FIG. 9 is a view of a second application of the present invention, showing the fluid flowing path produced by the pre-power device.
Figure 10:
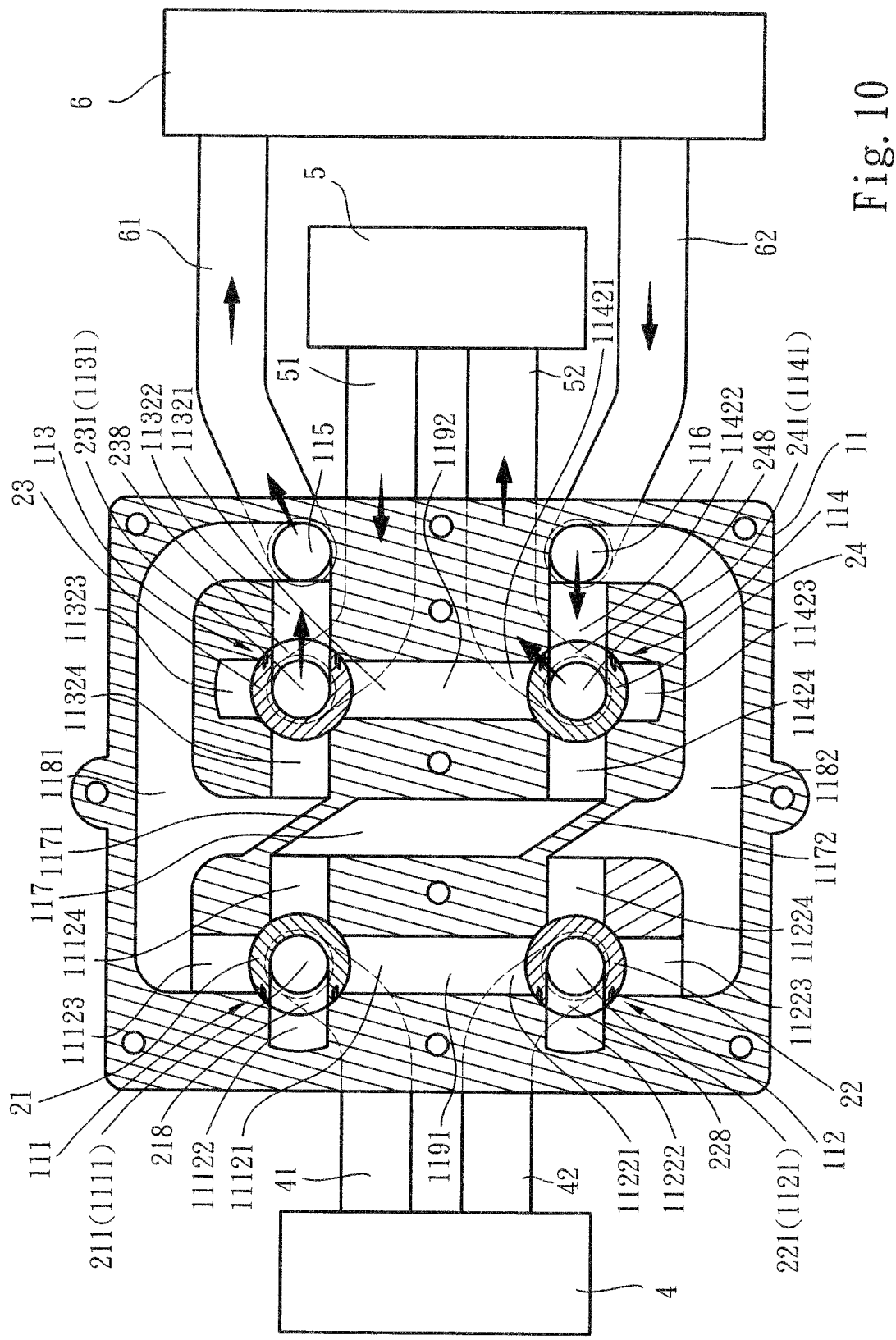
FIG. 10 is a view of the second application of the present invention, showing the fluid flowing path produced by the post-power device.

Please refer to FIGS. 9 and 10, which show a second application of the above structure of the present invention. In FIG. 9, the first, second, third and fourth switch members 21, 22, 23, 24 are respectively sectioned along the portions of the first, second, third and fourth lower flow guide windows 218, 228, 238, 248, while a top plane view of the first, second, third and fourth control sections 111, 112, 113, 114 of the seat body 11 is shown. When the first, second, third and fourth switch members 21, 22, 23, 24 are such rotated (moved) that the first, second, third and fourth lower flow guide windows 218, 228, 238, 248 are respectively aligned with the second pre-output bypass 11122, the second pre-input bypass 11222, the second post-output bypass 11322 and the second post-input bypass 11422, the fluid flowing out from the pre-output passage 41 of the pre-power device 4 flows through the first main flow way 1111 to sequentially pass through the first flow guide passage 211 and the first lower flow guide window 218 and then sequentially pass through the second pre-output bypass 11122, the second pre-output inner communication passage 11152 to flow into the first inner circulation passage 1115. Then the fluid flows from the first pre-output inner communication passage 11151 to sequentially pass through the first pre-input bypass 11221 and the first longitudinal passage 1191 to the first pre-input bypass 11221. Then the fluid flows from the first pre-input inner communication passage 11251 into the second inner circulation passage 1125. Then the fluid flows from the second pre-input inner communication passage 11252 to sequentially pass through the second pre-input bypass 11222, the second lower flow guide window 228, the second flow guide passage 221, the second main flow way 1121 and the pre-input passage 42 and flow back to the pre-power device 4. In this case, the pre-power device 4 forms an internal fluid circulation without outputting fluid to the load 6.

In FIG. 10, the fluid flowing out from the post-output passage 51 of the post-power device 5 flows through the third main flow way 1131 to sequentially pass through the third flow guide passage 231 and the third lower flow guide window 238 and then pass through the second post-output bypass 11322 to flow into the first load flow way 115 and the first load passage 61 and pass through the load 6. Then the fluid flows from the second load passage 62 to pass through the second load flow way 116 and the second post-input bypass 11422 into the fourth lower flow guide window 248. Then the fluid sequentially passes through the fourth flow guide passage 241 and the fourth main flow way 1141 to further flow through the post-input passage 52 back to the post-power device 5. In this case, the post-power device 5 solely forms a fluid circulation for driving the load 6 to work.

In the case that the pre-power device 4 is set a power outputting device (such as a vehicle engine) and the post-power device 5 is set another power outputting device (such as an electric motor), while the load 6 is set a device for receiving the power, (such as a transmission case), then the post-power device 5 drives the load 6, while the pre-power device 4 forms an internal fluid circulation without outputting fluid to the load 6. This function is similar to a situation that the engine of a hybrid electric vehicle stops operating, while the electric motor of the hybrid electric vehicle solely drives the transmission case to operate.

Figure 11:
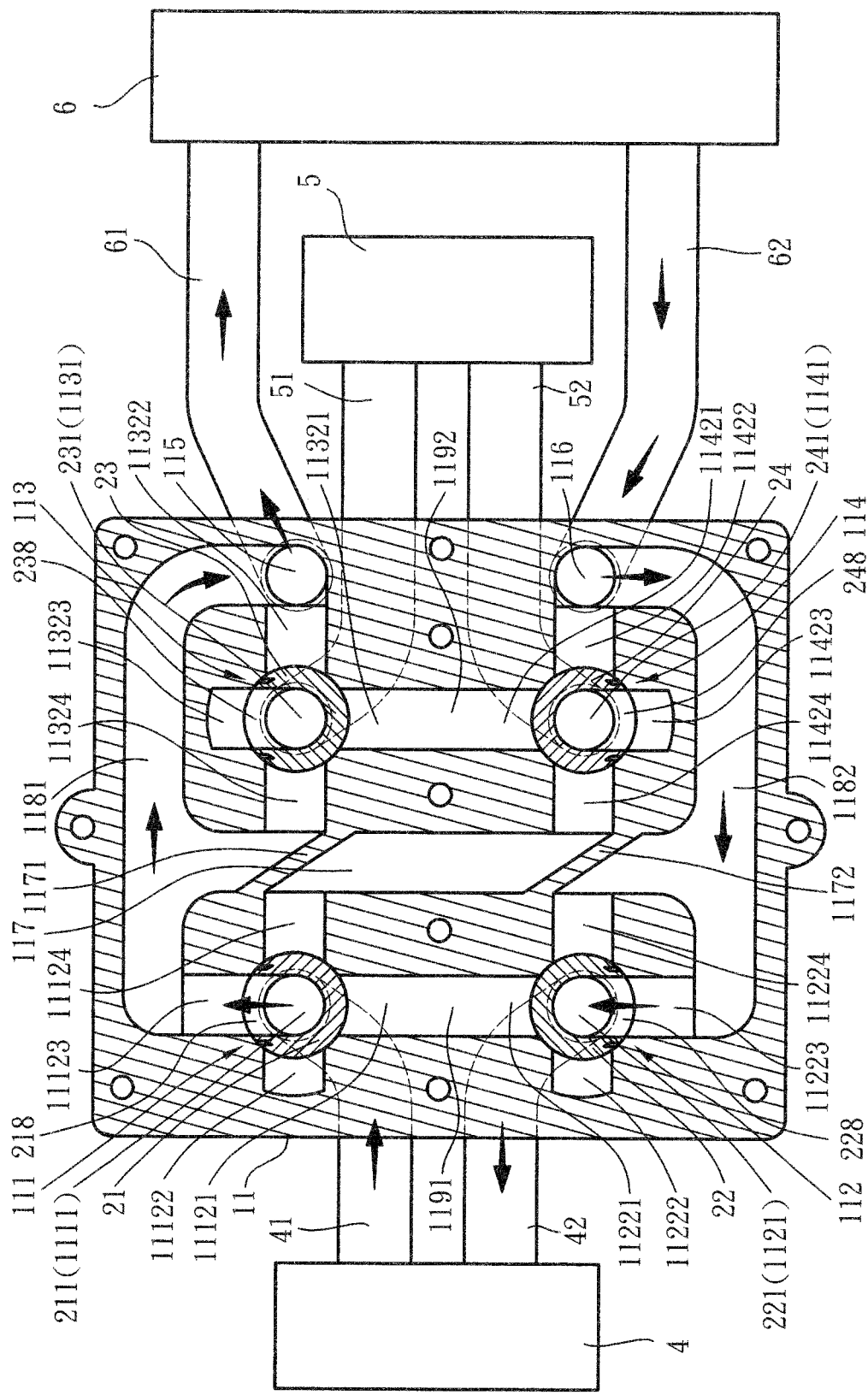
FIG. 11 is a view of a third application of the present invention, showing the fluid flowing path produced by the pre-power device.
Figure 12:
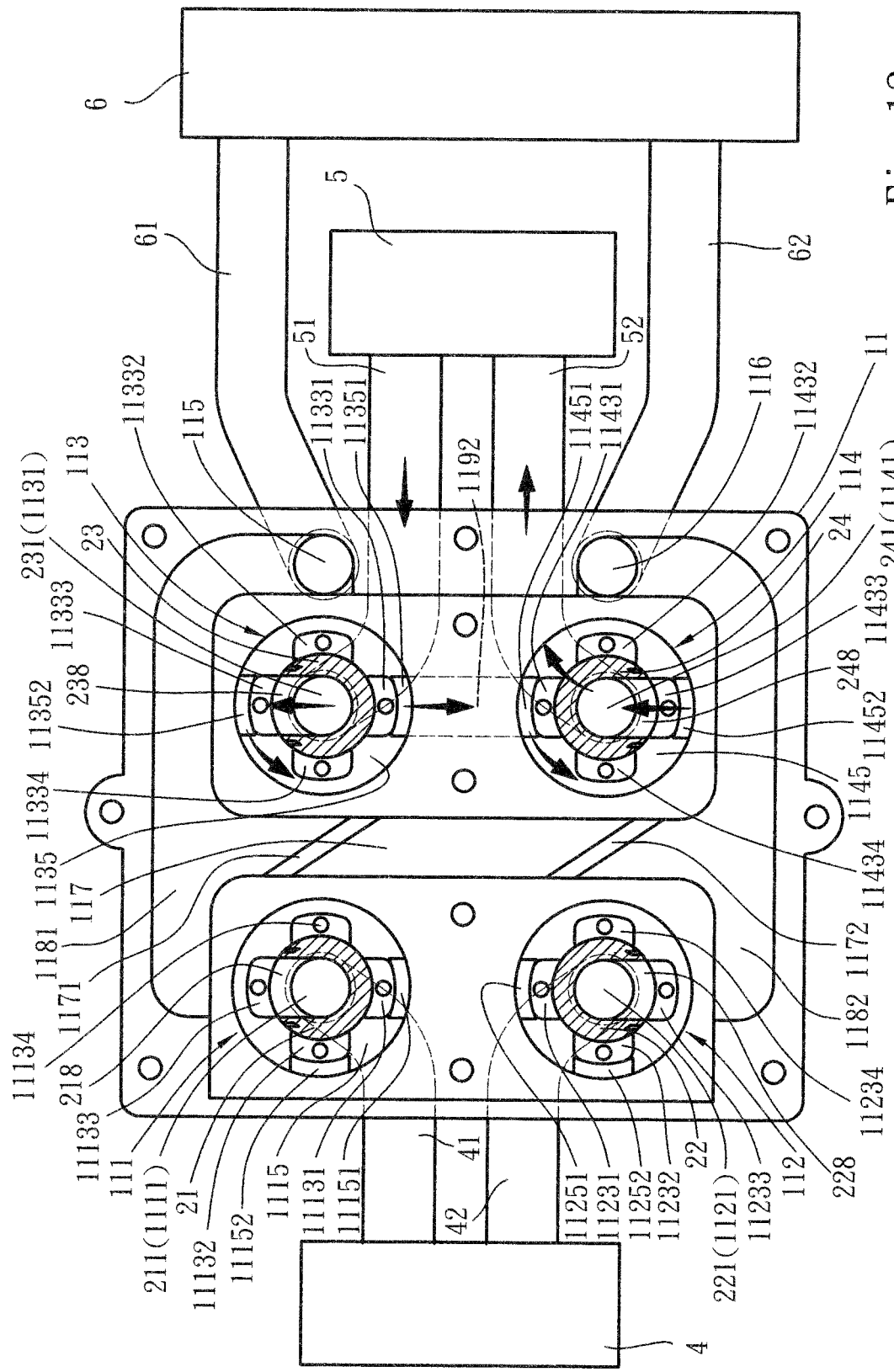
FIG. 12 is a view of the third application of the present invention, showing the fluid flowing path produced by the post-power device.

Please now refer to FIGS. 11 and 12, which show a third application of the above structure of the present invention. In FIG. 12, the first, second, third and fourth switch members 21, 22, 23, 24 are respectively sectioned along the portions of the first, second, third and fourth lower flow guide windows 218, 228, 238, 248, while a top plane view of the first, second, third and fourth control sections 111, 112, 113, 114 of the seat body 11 is shown. When the first, second, third and fourth switch members 21, 22, 23, 24 are such rotated (moved) that the first, second, third and fourth lower flow guide windows 218, 228, 238, 248 are respectively aligned with the third pre-output bypass 11123, the third pre-input bypass 11223, the third post-output bypass 11323 and the third post-input bypass 11423, the fluid flowing out from the post-output passage 51 of the post-power device 5 flows through the third main flow way 1131 to sequentially pass through the third flow guide passage 231 and the third lower flow guide window 238 and then sequentially pass through the third post-output bypass 11323, the second post-output inner communication passage 11352 to flow into the third inner circulation passage 1135. Then the fluid sequentially flows through the first post-output inner communication passage 11351, the first post-output bypass 11321, the second longitudinal passage 1192, the first post-input bypass 11421 and the first post-input inner communication passage 11451 into the fourth inner circulation passage 1145. Finally, the fluid sequentially flows through the second post-input inner communication passage 11452, the third post-input bypass 11423, the fourth lower flow guide window 248, the fourth flow guide passage 241, the fourth main flow way 1141 and the post-input passage 52 back to the post-power device 5. Accordingly, the post-power device 5 forms an internal fluid circulation without outputting fluid to the load 6.

In FIG. 11, the fluid flowing out from the pre-output passage 41 of the pre-power device 4 flows through the first main flow way 1111 to sequentially pass through the first flow guide passage 211 and the first lower flow guide window 218 and then sequentially pass through the third post-output bypass 11322, the first transverse passage 1181, the first load flow way 115 and the first load passage 61 to flow into the load 6. Then the fluid sequentially flows through the second load passage 62, the second load flow way 116, the second transverse passage 1182 and the third pre-input bypass 11223 to flow from the second lower flow guide window 228 sequentially through the second flow guide passage 221, the second main flow way 1121 and the pre-input passage 42 back to the pre-power device 4. In this case, the pre-power device 4 solely forms a fluid circulation for driving the load 6 to work.

In the case that the pre-power device 4 is set a power outputting device (such as a vehicle engine) and the post-power device 5 is set another power outputting device (such as an electric motor), while the load 6 is set a device for receiving the power, (such as a transmission case), then the pre-power device 4 drives the load 6, while the post-power device 5 forms an internal fluid circulation without outputting fluid to the load 6. This function is similar to a situation that the electric motor of a hybrid electric vehicle stops working, while the engine of the hybrid electric vehicle solely drives the transmission case to operate.

Figure 13:
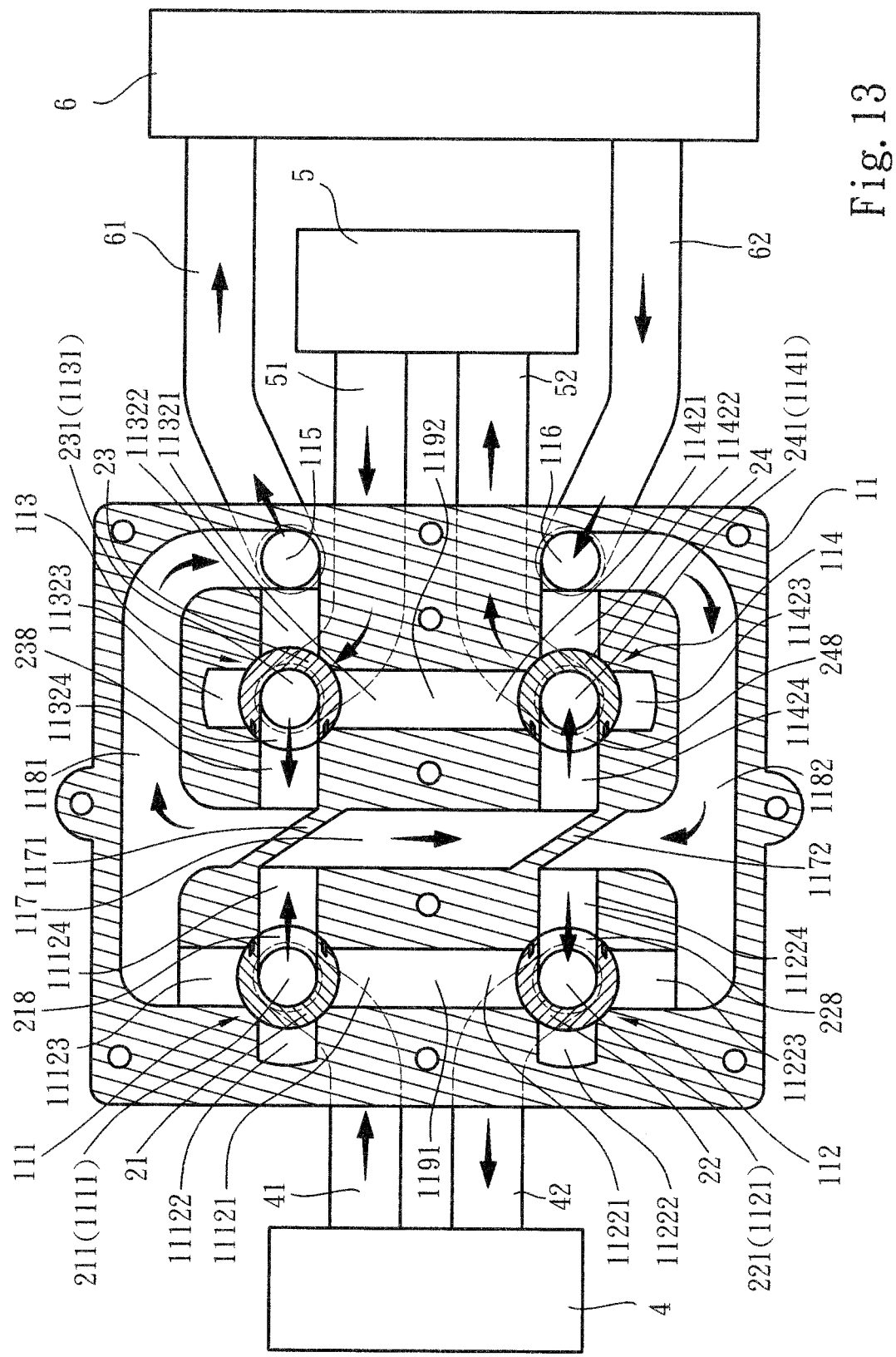
FIG. 13 is a view of a fourth application of the present invention.

Please now refer to FIG. 13, which shows a fourth application of the above structure of the present invention. When the first, second, third and fourth switch members 21, 22, 23, 24 are such rotated (moved) that the first, second, third and fourth lower flow guide windows 218, 228, 238, 248 are respectively aligned with the fourth pre-output bypass 11124, the fourth pre-input bypass 11224, the fourth post-output bypass 11324 and the fourth post-input bypass 11424, the fluid flowing out from the pre-output passage 41 of the pre-power device 4 flows through the first main flow way 1111 to sequentially pass through the first flow guide passage 211 and the first lower flow guide window 218 and then sequentially pass through the fourth pre-output bypass 11124, the oblique passage 117 and the fourth post-input bypass 11424 to flow into the fourth lower flow guide window 248. Then the fluid sequentially flows through the fourth flow guide passage 241, the fourth main flow way 1141 and the post-input passage 52 into the post-power device 5. In addition, the fluid flowing from the pre-power device 4 into the post-power device 5 and the fluid of the post-power device 5 together flow out from the post-output passage 51 to sequentially pass through the third main flow way 1131, the third flow guide passage 231, the third lower flow guide window 238 and the fourth post-output bypass 11324 to the first transverse passage 1181. Then the fluid flows through the first load passage 115 and the first load passage 61 to the load 6 and then flows out from the second load passage 62 to sequentially pass through the second load flow way 116, the second transverse passage 1182 and the fourth pre-input bypass 11224 to the second lower flow guide window 228. Finally, the fluid sequentially flows through the second flow guide passage 221, the second main flow way 1121 and the pre-input passage 42 back to the pre-power device 4. In this case, the pre-power device 4 and the post-power device 5 together form a fluid circulation for driving the load 6.

In the case that the pre-power device 4 is set a power outputting device (such as a vehicle engine) and the post-power device 5 is set another power outputting device (such as an electric motor), while the load 6 is set a device for receiving the power, (such as a transmission case), then, in a common state, in the case that the pre-power device 4 and the post-power device 5 together drive the load 6, the function is similar to a situation that the engine and the electric motor of a hybrid electric vehicle at the same time drive the transmission case to operate in a high-horse power output state.

However, in practical application, in many conditions, the pre-power device 4 is situated in a state that the pre-power device 4 temporarily fails to output power, (for example, the power supply of the electric motor is insufficient and needs to be driven to generate power). When the pre-power device 4 temporarily stops outputting power, the post-power device 5 can drive both the pre-power device 4 and the load 6 to operate. When the post-power device 5 temporarily stops outputting power, the pre-power device 4 can drive both the post-power device 5 and the load 6 to operate.

In conclusion, the double-power-supply complex control device of the present invention can truly simplify the entire structure and enhance the convenience in operation. Moreover, the double-power-supply complex control device of the present invention has the effect of stabilizing fluid transfer quality.

The above embodiments are only used to illustrate the present invention, not intended to limit the scope thereof. Many modifications of the above embodiments can be made without departing from the spirit of the present invention.

What is claimed is:

1. A double-power-supply complex control device characterized in that the double-power-supply complex control device at least comprises a main body, a first control section, a second control section, a third control section and a fourth control section being respectively disposed in the main body, a first main flow way, a second main flow way, a third main flow way and a fourth main flow way being respectively correspondingly disposed at a center of the first, second, third and fourth control sections, a circumference of the first main flow way being sequentially in communication with a first pre-output bypass, a second pre-output bypass, a third pre-output bypass and a fourth pre-output bypass, a circumference of the second main flow way being sequentially in communication with a first pre-input bypass, a second pre-input bypass, a third pre-input bypass and a fourth pre-input bypass, a circumference of the third main flow way being sequentially in communication with a first post-output bypass, a second post-output bypass, a third post-output bypass and a fourth post-output bypass, a circumference of the fourth main flow way being sequentially in communication with a first post-input bypass, a second post-input bypass, a third post-input bypass and a fourth post-input bypass, the first pre-output bypass being in communication with the first pre-input bypass, the first post-output bypass being in communication with the first post-input bypass, the fourth pre-output bypass being in communication with the fourth post-input bypass; the second and fourth post-output bypasses and the third pre-output bypass are in communication with a first load flow way and the third and fourth pre-input bypasses and the second post-input bypass are in communication with a second load flow way, and a switch assembly composed of a first switch member, a second switch member, a third switch member and a fourth switch member, which are respectively sequentially disposed in the first, second, third and fourth main flow ways, a first flow guide passage, a second flow guide passage, a third flow guide passage and a fourth flow guide passage being respectively disposed in the first, second, third and fourth switch members in communication with the first, second, third and fourth main flow ways, an outer circumference of each switch member being formed with a first lower flow guide window, a second lower flow guide window, a third lower flow guide window and a fourth lower flow guide window in communication with the first, second, third and fourth flow guide passages, the first, second, third and fourth switch members being drivable to switch the first lower flow guide window between the first, second, third and fourth pre-output bypasses to selectively communicate with the first, second, third and fourth pre-output bypasses, the second lower flow guide window between the first, second, third and fourth pre-input bypasses to selectively communicate with the first, second, third and fourth pre-input bypasses, the third lower flow guide window between the first, second, third and fourth post-output bypasses to selectively communicate with the first, second, third and fourth post-output bypasses and the fourth lower flow guide window between the first, second, third and fourth post-input bypasses to selectively communicate with the first, second, third and fourth post-input bypasses.

2. The double-power-supply complex control device as claimed in claim 1, characterized in that a first pre-output stop section, a second pre-output stop section, a third pre-output stop section and a fourth pre-output stop section are respectively disposed along the circumference of the first main flow way corresponding respectively sequentially to the first, second, third and fourth pre-output bypasses, a first communication opening being respectively disposed between the first, second, third and fourth pre-output stop sections, a first inner circulation passage is disposed along the outer circumferences of the first, second, third, fourth pre-output stop sections and the first communication opening, the first inner circulation passage being in communication with the first communication opening, the first inner circulation passage being in communication with the first pre-output bypass and the second pre-output bypass respectively via a first pre-output inner communication passage and a second pre-output inner communication passage, a first upper flow guide window being further disposed on the outer circumference of the first switch member in communication with the first flow guide passage, whereby when the first switch member is operated, the first upper flow guide window is synchronously moved with the first lower flow guide window and selectively aligned with one of the first, second, third and fourth pre-output stop sections, a first pre-input stop section, a second pre-input stop section, a third pre-input stop section and a fourth pre-input stop section being respectively disposed along the circumference of the second main flow way corresponding respectively sequentially to the first, second, third and fourth pre-input bypasses, a second communication opening being respectively disposed between the first, second, third and fourth pre-input stop sections, a second inner circulation passage is disposed along the outer circumferences of the first, second, third, fourth pre-input stop sections and the second communication opening, the second inner circulation passage being in communication with the first pre-input bypass and the second pre-input bypass respectively via a first pre-input inner communication passage and a second pre-input inner communication passage, a second upper flow guide window being further disposed on the outer circumference of the second switch member in communication with the second flow guide passage, whereby when the second switch member is operated, the second upper flow guide window is synchronously moved with the second lower flow guide window and selectively aligned with one of the first, second, third and fourth pre-input stop sections, a first post-output stop section, a second post-output stop section, a third post-output stop section and a fourth post-output stop section being respectively disposed along the circumference of the third main flow way corresponding respectively sequentially to the first, second, third and fourth post-output bypasses, a third communication opening being respectively disposed between the first, second, third and fourth post-output stop sections, a third inner circulation passage is disposed along the outer circumferences of the first, second, third, fourth post-output stop sections and the third communication opening, the third inner circulation passage being in communication with the first post-output bypass and the third post-output bypass respectively via a first post-output inner communication passage and a second post-output inner communication passage, a third upper flow guide window being further disposed on the outer circumference of the third switch member in communication with the third flow guide passage, whereby when the third switch member is operated, the third upper flow guide window is synchronously moved with the third lower flow guide window and selectively aligned with one of the first, second, third and fourth post-output stop sections, a first post-input stop section, a second post-input stop section, a third post-input stop section and a fourth post-input stop section being respectively disposed along the circumference of the fourth main flow way corresponding respectively sequentially to the first, second, third and fourth post-input bypasses, a fourth communication opening being respectively disposed between the first, second, third and fourth post-input stop sections, a fourth inner circulation passage is disposed along the outer circumferences of the first, second, third, fourth post-output stop sections and the fourth communication opening, the fourth inner circulation passage being in communication with the first post-input bypass and the third post-input bypass respectively via a first post-input inner communication passage and a second post-input inner communication passage, a fourth upper flow guide window being further disposed on the outer circumference of the fourth switch member in communication with the fourth flow guide passage, whereby when the fourth switch member is operated, the fourth upper flow guide window is synchronously moved with the fourth lower flow guide window and selectively aligned with one of the first, second, third and fourth post-input stop sections.

3. The double-power-supply complex control device as claimed in claim 2, characterized in that a first middle annular groove being disposed between the first lower flow guide window and the first upper flow guide window of the first switch member, a first middle ring section being disposed in the first middle annular groove, a first lower annular groove being disposed on one side of the first lower flow guide relative to the first middle annular groove, a first upper annular groove being disposed on one side of the first upper flow guide window relative to the first middle annular groove, a first upper ring section being disposed in the first upper annular groove, two first lower longitudinal grooves being respectively disposed on two sides of the first lower flow guide window, the first lower flow guide window being respectively in communication with the first lower annular groove and the first middle annular groove, a first lower longitudinal sealing section being respectively disposed in each first lower longitudinal groove, two first upper longitudinal grooves being respectively disposed on two sides of the first upper flow guide window, the first upper longitudinal groove being respectively in communication with the first middle annular groove and the first upper annular groove, a first upper longitudinal sealing section being disposed in each first upper longitudinal groove, the first upper ring section, the first middle ring section and the first lower ring section and the first upper longitudinal sealing section and the first lower longitudinal sealing section being respectively sealedly positioned between the first switch member and inner wall of the first main flow way so as to provide excellent elastic sealing effect along peripheries of the first upper flow guide window and the first lower flow guide window, the second, third and fourth switch members having the same structure as the first switch member.

4. The double-power-supply complex control device as claimed in claim 2, characterized in that the main body is composed of a seat body and a cover body mated and assembled with each other, the first, second, third and fourth main flow ways being respectively disposed in the seat body, a first annular flange, a second annular flange, a third annular flange and a fourth annular flange being respectively correspondingly disposed along an inner circumference of one end of the first, second, third and fourth main flow ways, the cover body being sealedly capped on the other end of the first, second, third and fourth main flow ways, the first, second, third and fourth switch members being disposed in the first, second, third and fourth main flow ways, a first drive shaft rod, a second drive shaft rod, a third drive shaft rod and a fourth drive shaft rod being respectively correspondingly disposed on one end of the first, second, third and fourth switch members, the first, second, third and fourth drive shaft rods passing through the cover body and outward protruding from the main body, on one end of the first, second, third and fourth switch members, which end without disposing the first, second, third and fourth drive shaft rods, the first, second, third and fourth switch members correspondingly disposed on the first, second, third and fourth annular flanges whereby the first, second, third and fourth switch members are movably restricted within the first, second, third and fourth control sections of the main body.

5. The double-power-supply complex control device as claimed in claim 2, characterized in that a linking assembly is disposed on outer side of the main body, the linking assembly including a first linking member, a second linking member, a third linking member and a fourth linking member, which are respectively connected with the first, second, third and fourth switch members so as to drive the first, second, third and fourth switch members.

6. The double-power-supply complex control device as claimed in claim 2, characterized in that the first main flow way is in communication with a pre-output passage of a pre-power device for outputting a fluid and the second main flow way is in communication with a pre-input passage of the pre-power device for inputting the fluid, while the third main flow way is in communication with a post-output passage of a post-power device for outputting the fluid and the fourth main flow way is in communication with a post-input passage of the post-power device for inputting the fluid, the first and second load flow ways being in communication with a load.

7. The double-power-supply complex control device as claimed in claim 2, characterized in that the second control section is disposed on one side of the first control section, a transverse borderline as a basis being defined between the first control section and the second control section, the first, second, third and fourth pre-input bypasses of the second control section and the first, second, third and fourth pre-output bypasses of the first control section being such arranged that the first, second, third and fourth pre-input bypasses of the second control section are reflections of the first, second, third and fourth pre-output bypasses of the first control section with respect to the transverse borderline, the third and fourth control sections being respectively disposed on the same side of the first and second control sections, a longitudinal borderline as a basis being defined between the first and second control sections and the third and fourth control sections, the first, second, third and fourth post-output bypasses of the third control section and the first, second, third and fourth pre-output bypasses of the first control section being such arranged that the first, second, third and fourth post-output bypasses of the third control section are reflections of the first, second, third and fourth pre-output bypasses of the first control section with respect to the longitudinal borderline, the first, second, third and fourth post-input bypasses of the fourth control section and the first, second, third and fourth pre-input bypasses of the second control section being such arranged that the first, second, third and fourth post-input bypasses of the fourth control section are reflections of the first, second, third and fourth pre-input bypasses of the second control section with respect to the longitudinal borderline.

8. The double-power-supply complex control device as claimed in claim 2, characterized in that when one of the first, second, third, fourth switch members is rotated, the first, second, third, fourth lower flow guide windows are synchronously rotated, when the first lower flow guide window of the first switch member is rotated to correspond to the first pre-output bypass, the second lower flow guide window of the second switch member is rotated to correspond to the first pre-input bypass, the third lower flow guide window of the third switch member is rotated to correspond to the first post-output bypass, and the fourth lower guide window of the fourth switch member is rotated to correspond to the first post-input bypass; and when the first lower flow guide window of the first switch member is rotated to correspond to the second pre-output bypass, the second lower flow guide window of the second switch member is rotated to correspond to the second pre-input bypass, the third lower flow guide window of the third switch member is rotated to correspond to the second post-output bypass, and the fourth lower guide window of the further switch member is rotated to correspond to the second post-input bypass; and when the first lower flow guide window of the first switch member is rotated to correspond to the third pre-output bypass, the second lower flow guide window of the second switch member is rotated to correspond to the third pre-input bypass, the third lower flow guide window of the third switch member is rotated to correspond to the third post-output bypass, and the fourth lower guide window of the fourth switch member is rotated to correspond to the third post-input bypass; and when the first lower flow guide window of the first switch member is rotated to correspond to the fourth pre-output bypass, the second lower flow guide window of the second switch member is rotated to correspond to the fourth pre-input bypass, the third lower flow guide window of the third switch member is rotated to correspond to the fourth post-output bypass, and the fourth lower guide window of the fourth switch member is rotated to correspond to the fourth post-input bypass.

9. The double-power-supply complex control device as claimed in claim 1, characterized in that the second control section is disposed on one side of the first control section, a transverse borderline as a basis being defined between the first control section and the second control section, the first, second, third and fourth pre-input bypasses of the second control section and the first, second, third and fourth pre-output bypasses of the first control section being such arranged that the first, second, third and fourth pre-input bypasses of the second control section are reflections of the first, second, third and fourth pre-output bypasses of the first control section with respect to the transverse borderline, the third and fourth control sections being respectively disposed on the same side of the first and second control sections, a longitudinal borderline as a basis being defined between the first and second control sections and the third and fourth control sections, the first, second, third and fourth post-output bypasses of the third control section and the first, second, third and fourth pre-output bypasses of the first control section being such arranged that the first, second, third and fourth post-output bypasses of the third control section are reflections of the first, second, third and fourth pre-output bypasses of the first control section with respect to the longitudinal borderline, the first, second, third and fourth post-input bypasses of the fourth control section and the first, second, third and fourth pre-input bypasses of the second control section being such arranged that the first, second, third and fourth post-input bypasses of the fourth control section are reflections of the first, second, third and fourth pre-input bypasses of the second control section with respect to the longitudinal borderline.

10. The double-power-supply complex control device as claimed in claim 9, characterized in that a linking assembly is disposed on outer side of the main body, the linking assembly including a first linking member, a second linking member, a third linking member and a fourth linking member, which are respectively connected with the first, second, third and fourth switch members so as to drive the first, second, third and fourth switch members.

11. The double-power-supply complex control device as claimed in claim 9, characterized in that the first main flow way is in communication with a pre-output passage of a pre-power device for outputting a fluid and the second main flow way is in communication with a pre-input passage of the pre-power device for inputting the fluid, while the third main flow way is in communication with a post-output passage of a post-power device for outputting the fluid and the fourth main flow way is in communication with a post-input passage of the post-power device for inputting the fluid, the first and second load flow ways being in communication with a load.

12. The double-power-supply complex control device as claimed in claim 9, characterized in that the main body is composed of a seat body and a cover body mated and assembled with each other, the first, second, third and fourth main flow ways being respectively disposed in the seat body, a first annular flange, a second annular flange, a third annular flange and a fourth annular flange being respectively correspondingly disposed along an inner circumference of one end of the first, second, third and fourth main flow ways, the cover body being sealedly capped on the other end of the first, second, third and fourth main flow ways, the first, second, third and fourth switch members being disposed in the first, second, third and fourth main flow ways, a first drive shaft rod, a second drive shaft rod, a third drive shaft rod and a fourth drive shaft rod being respectively correspondingly disposed on one end of the first, second, third and fourth switch members, the first, second, third and fourth drive shaft rods passing through the cover body and outward protruding from the main body, on one end of the first, second, third and fourth switch members, which end without disposing the first, second, third and fourth drive shaft rods, the first, second, third and fourth switch members correspondingly disposed on the first, second, third and fourth annular flanges whereby the first, second, third and fourth switch members are movably restricted within the first, second, third and fourth control sections of the main body.

13. The double-power-supply complex control device as claimed in claim 9, characterized in that when one of the first, second, third, fourth switch members is rotated, the first, second, third, fourth lower flow guide windows are synchronously rotated, when the first lower flow guide window of the first switch member is rotated to correspond to the first pre-output bypass, the second lower flow guide window of the second switch member is rotated to correspond to the first pre-input bypass, the third lower flow guide window of the third switch member is rotated to correspond to the first post-output bypass, and the fourth lower guide window of the fourth switch member is rotated to correspond to the first post-input bypass; and when the first lower flow guide window of the first switch member is rotated to correspond to the second pre-output bypass, the second lower flow guide window of the second switch member is rotated to correspond to the second pre-input bypass, the third lower flow guide window of the third switch member is rotated to correspond to the second post-output bypass, and the fourth lower guide window of the further switch member is rotated to correspond to the second post-input bypass; and when the first lower flow guide window of the first switch member is rotated to correspond to the third pre-output bypass, the second lower flow guide window of the second switch member is rotated to correspond to the third pre-input bypass, the third lower flow guide window of the third switch member is rotated to correspond to the third post-output bypass, and the fourth lower guide window of the fourth switch member is rotated to correspond to the third post-input bypass; and when the first lower flow guide window of the first switch member is rotated to correspond to the fourth pre-output bypass, the second lower flow guide window of the second switch member is rotated to correspond to the fourth pre-input bypass, the third lower flow guide window of the third switch member is rotated to correspond to the fourth post-output bypass, and the fourth lower guide window of the fourth switch member is rotated to correspond to the fourth post-input bypass.

14. The double-power-supply complex control device as claimed in claim 1, characterized in that the main body is composed of a seat body and a cover body mated and assembled with each other, the first, second, third and fourth main flow ways being respectively disposed in the seat body, a first annular flange, a second annular flange, a third annular flange and a fourth annular flange being respectively correspondingly disposed along an inner circumference of one end of the first, second, third and fourth main flow ways the cover body being sealedly capped on the other end of the first, second, third and fourth main flow ways, the first, second, third and fourth switch members being disposed in the first, second, third and fourth main flow ways, a first drive shaft rod, a second drive shaft rod, a third drive shaft rod and a fourth drive shaft rod being respectively correspondingly disposed on one end of the first, second, third and fourth switch members, the first, second, third and fourth drive shaft rods passing through the cover body and outward protruding from the main body, on one end of the first, second, third and fourth switch members, which end without disposing the first, second, third and fourth drive shaft rods, the first, second, third and fourth switch members correspondingly disposed on the first, second, third and fourth annular flanges whereby the first, second, third and fourth switch members are movably restricted within the first, second, third and fourth control sections of the main body.

15. The double-power-supply complex control device as claimed in claim 1, characterized in that a linking assembly is disposed on outer side of the main body, the linking assembly including a first linking member, a second linking member, a third linking member and a fourth linking member, which are respectively connected with the first, second, third and fourth switch members so as to drive the first, second, third and fourth switch members.

16. The double-power-supply complex control device as claimed in claim 15, characterized in that the first main flow way is in communication with a pre-output passage of a pre-power device for outputting a fluid and the second main flow way is in communication with a pre-input passage of the pre-power device for inputting the fluid, while the third main flow way is in communication with a post-output passage of a post-power device for outputting the fluid and the fourth main flow way is in communication with a post-input passage of the post-power device for inputting the fluid, the first and second load flow ways being in communication with a load.

17. The double-power-supply complex control device as claimed in claim 1, characterized in that the first main flow way is in communication with a pre-output passage of a pre-power device for outputting a fluid and the second main flow way is in communication with a pre-input passage of the pre-power device for inputting the fluid, while the third main flow way is in communication with a post-output passage of a post-power device for outputting the fluid and the fourth main flow way is in communication with a post-input passage of the post-power device for inputting the fluid, the first and second load flow ways being in communication with a load.

18. The double-power-supply complex control device as claimed in claim 1, characterized in that when one of the first, second, third, fourth switch members is rotated, the first, second, third, fourth lower flow guide windows are synchronously rotated, when the first lower flow guide window of the first switch member is rotated to correspond to the first pre-output bypass, the second lower flow guide window of the second switch member is rotated to correspond to the first pre-input bypass, the third lower flow guide window of the third switch member is rotated to correspond to the first post-output bypass, and the fourth lower guide window of the fourth switch member is rotated to correspond to the first post-input bypass; and when the first lower flow guide window of the first switch member is rotated to correspond to the second pre-output bypass, the second lower flow guide window of the second switch member is rotated to correspond to the second pre-input bypass, the third lower flow guide window of the third switch member is rotated to correspond to the second post-output bypass, and the fourth lower guide window of the further switch member is rotated to correspond to the second post-input bypass; and when the first lower flow guide window of the first switch member is rotated to correspond to the third pre-output bypass, the second lower flow guide window of the second switch member is rotated to correspond to the third pre-input bypass, the third lower flow guide window of the third switch member is rotated to correspond to the third post-output bypass, and the fourth lower guide window of the fourth switch member is rotated to correspond to the third post-input bypass; and when the first lower flow guide window of the first switch member is rotated to correspond to the fourth pre-output bypass, the second lower flow guide window of the second switch member is rotated to correspond to the fourth pre-input bypass, the third lower flow guide window of the third switch member is rotated to correspond to the fourth post-output bypass, and the fourth lower guide window of the fourth switch member is rotated to correspond to the fourth post-input bypass.

19. The double-power-supply complex control device as claimed in claim 18, characterized in that the first main flow way is in communication with a pre-output passage of a pre-power device for outputting a fluid and the second main flow way is in communication with a pre-input passage of the pre-power device for inputting the fluid, while the third main flow way is in communication with a post-output passage of a post-power device for outputting the fluid and the fourth main flow way is in communication with a post-input passage of the post-power device for inputting the fluid, the first and second load flow ways being in communication with a load.

* * * * *